United States Patent
Christensen et al.

(10) Patent No.: US 6,314,752 B1
(45) Date of Patent: Nov. 13, 2001

(54) MASS AND HEAT TRANSFER DEVICES AND METHODS OF USE

(75) Inventors: Richard N. Christensen, Columbus; Michael A. Garrabrant, Johnstown; Roger F. Stout, Columbus, all of OH (US)

(73) Assignee: The Ohio State University Research Foundation, Columbus, OH (US)

( * ) Notice: Subject to any disclaimer, the term of this patent is extended or adjusted under 35 U.S.C. 154(b) by 0 days.

(21) Appl. No.: 09/464,827

(22) Filed: Dec. 17, 1999

Related U.S. Application Data
(60) Provisional application No. 60/112,883, filed on Dec. 18, 1998.

(51) Int. Cl.⁷ .................................................. F25B 15/12
(52) U.S. Cl. .............................. 62/484; 62/906; 62/497; 62/476
(58) Field of Search ............................. 62/497, 476, 906, 62/484

(56) References Cited

U.S. PATENT DOCUMENTS

| | | |
|---|---|---|
| 1,247,917 | 11/1917 | Wentworth et al. . |
| 1,426,235 | 8/1922 | Wentworth . |
| 2,002,923 | 5/1935 | Palmer . |
| 2,006,649 | 7/1935 | Modine . |
| 2,119,761 | 6/1938 | Wentworth . |
| 2,653,800 | 9/1953 | Anton . |
| 2,789,797 | 4/1957 | Simpelaar . |
| 3,003,749 | 10/1961 | Morse . |
| 3,265,127 | 8/1966 | Nickol et al. . |
| 3,323,323 * | 6/1967 | Phillips .................................. 62/497 |
| 3,367,137 * | 2/1968 | Whitlow .................................. 62/497 |
| 3,380,518 | 4/1968 | Canteloube et al. . |
| 3,438,433 | 4/1969 | Gunter . |
| 4,328,861 | 5/1982 | Cheong et al. . |
| 4,573,330 * | 3/1986 | Van Der Sluys et al. ............. 62/476 |
| 4,693,307 | 9/1987 | Scarselletta . |
| 4,938,028 * | 7/1990 | Murray .................................. 62/108 |
| 4,941,329 * | 7/1990 | Imura et al. ........................... 62/476 |
| 5,157,942 * | 10/1992 | Dao ....................................... 62/476 |
| 5,339,654 | 8/1994 | Cook et al. . |
| 5,572,884 | 11/1996 | Christensen et al. . |
| 5,617,737 | 4/1997 | Christensen et al. . |
| 5,636,527 | 6/1997 | Christensen et al. . |
| 5,660,049 * | 8/1997 | Erickson ............................... 62/107 |
| 5,666,818 * | 9/1997 | Manrique-Valadez .............. 62/235.1 |
| 5,704,417 | 1/1998 | Christensen et al. . |

\* cited by examiner

*Primary Examiner*—William Doerrler
*Assistant Examiner*—Mark Shulman
(74) *Attorney, Agent, or Firm*—Philip J. Pollick

(57) ABSTRACT

A mass and heat transfer device uses a substantially vertical surface to separating a first fluid space from a second fluid space with the first fluid space containing a downward flowing liquid in at least a partially flooded state and an upward flowing gas contained at least partially within the downward flowing liquid. A fluid distribution surface with one or more apertures is provided within the first fluid space with the apertures controlling the downward passage and distribution of the downward flowing liquid and the upward passage and distribution of the upward flowing gas. A heat transfer fluid is used in the second fluid space for heat transfer with fluids in the first fluid space.

The fluid distribution surface can be used in a horizontal, vertical or angled position and in annular, cylindrical, and hexahedral forms. The mass and heat transfer device is especially compact when sheet metal plates and frames are used as enclosures for the first and second fluid spaces and is especially useful when used as absorbers, condensers, desorbers, and evaporators in an absorption refrigeration machine.

18 Claims, 25 Drawing Sheets

MASS AND HEAT TRANSFER DEVICES AND METHODS OF USE

CROSS REFERENCE TO RELATED APPLICATION

This application claims the benefit of U.S. provisional application No. 60/112,883 filed on Dec. 18, 1998, all of which is incorporated herein by reference as if completely written herein.

BACKGROUND OF THE INVENTION

1. Field of the Invention

The present invention relates to geometric surfaces for mass and heat transfer devices and their method or use. More particularly, it relates to hexahedral, annular and cylindrical fluid distribution surfaces with apertures formed therein for fluid management in a liquid system in at least a partially flooded state. The distribution surfaces are useful for heat and mass transfer in devices such as absorption refrigeration machines.

2. Background

Absorption refrigeration machines are heat operated refrigeration machines that operate on one of the earliest know principles of refrigeration. In their basic form, they consist of an interconnected absorber, desorber (generator), condenser, and evaporator that use a refrigerant and an absorbent as a refrigerant or solution pair and a heat source to transfer heat between a heat load and a heat sink.

The absorber contacts low pressure refrigerant vapor with a miscible absorbent. Absorption takes place as a result of the mixing tendency of the miscible materials as well as an affinity between the refrigerant vapor and the absorbent and results in the generation of thermal energy which is released to the heat sink. The mixture formed by the absorption process, which is referred to here as a strong solution, is typically pressurized by means of a solution pump and conveyed via a heat exchanger to the desorber (generator).

The desorber causes the refrigerant vapor and absorbent to separate as a result of the application of heat. When the absorbent is a nonvolatile material, heating of the strong solution is sufficient to accomplish complete separation of the refrigerant vapor. The remaining absorbent, referred to as a weak solution, is returned to the absorber to again begin the absorption process. When the absorbent is a volatile material such as water in an ammonia/water refrigerant pair, it is desirable to remove a good portion of the volatile absorbent (water) from the refrigerant vapor (ammonia) using an analyzer, which gives a relatively pure absorbent, or a rectifier, which gives a relatively pure vapor, or both.

After removal of absorbent from the vapor if needed, the vapor passes to the condenser. The condenser condenses the refrigerant vapor to a liquid with the liberation of heat. The hot liquid refrigerant then passes to the evaporator. The evaporator revaporizes the hot refrigerant liquid at low pressure and temperature with input of heat from the heat load, i.e., from the refrigerator, room, building, or other medium the system was designed to cool. From the evaporator, the refrigerant vapor enters the absorber to again cycle through the process.

In each of these components, at least two phases are present with mass transfer between the two phases and each typically involves a heat transfer component. The desorber uses heat to separate a strong solution into a vapor and a liquid absorbent (weak solution), the absorber combines the weak solution and vapor with release of heat, the condenser transforms refrigerant vapor to liquid with the release of heat and the evaporator transforms liquid refrigerant to vapor with the application of heat.

In the prior art, metal pipe or tubing, often wound in coils has been the preferred way to transfer heat to or form the mass transfer process. In evaporation or desorption processes, the liquid was flowed or sprayed over a coil of tubing containing a hot liquid to effect evaporation or desorption. Alternatively the heated coil was submerged in a liquid pool. For an absorber or condenser, the vapor was exposed to a coolant coil to achieve condensation while in an absorber, the absorbent was sprayed or dripped over the coolant coil in the presence of vapor. Alternatively the cooling coil was submerged in a pool of the solution.

As shown in U.S. Pat. Nos. 5,617,737 and 5,572,884, tubing can be manufactured with enhanced heat transfer surfaces. However, such tubing is quite expensive, large amounts are needed, and the convoluted shapes are difficult and expensive to manufacture. Moreover they typically require a large amount of space to effect the desired process.

As seen in U.S. Pat. Nos. 5,636,627 and 5,704,417, some effort has been made to use a falling film technique in which a thin film of liquid flows downward and covers the surfaces of the device to effect both heat and mass transfer. Such devices, while not as costly as tubing and pipe, require careful and exact dimensions, tolerances, alignment, configuration and leveling in order to achieve the desired surface wetting. When only a part of the heat transfer surface is wetted, the heat transfer effect is decreased significantly because of the loss of heat transfer area. In high-heat devices such as desorbers, lack of complete wetting can result in burnout, devise warping, and metal fatigue which in turn further accentuate the wetting problem. In addition, fluid and vapor flows must be precisely controlled to avoid flooding and resulting destruction of the falling film and its effectiveness.

Accordingly, it is an object of the present invention to provide a device that maximizes the heat transfer between two fluids.

It is an object of the present invention to provide a device that maximizes mass transfer between two fluids.

It is an object of the present invention to provide a device that is simple and inexpensive to manufacture.

It is an object of the present invention to provide a device that is compact in size.

It is an object of the present invention to provide a device that eliminates warping and component distortion under high heat conditions.

Another object of this invention is to provide a device that affords improved liquid-vapor equilibrium conditions.

Another object of this invention is to provide a device that improves the heat transfer efficiency to or from a heat transfer fluid.

Yet another object of this invention is to provide a heat and mass transfer device that can be used with a wide variety of heat transfer fluids.

Another object of this invention is to provide a device for the effective direct heat transfer between endothermic and exothermic processes.

Another object of this invention is to provide for improved devices that can be more effectively connected to each other.

Another object of this invention is to provide an improved device for use with evaporation, desorption, absorption, condensation, analyzer and rectification processes.

Still another object of this invention is to provide improved components for use in heat transfer absorption machines.

Other objects of the invention will become more apparent to those with ordinary skill in the art from consideration of the present disclosure.

SUMMARY OF THE INVENTION

A heat exchanger uses a substantially vertical surface to separating a first fluid space from a second fluid space with the first fluid space containing a downward flowing liquid in at least a partially flooded state and an upward flowing gas contained at least partially within the downward flowing liquid. A fluid distribution surface with one or more apertures is provided within the first fluid space with the apertures controlling the downward passage and distribution of the downward flowing liquid and the upward passage and distribution of the upward flowing gas. A heat transfer fluid is used in the second fluid space for heat transfer with fluids in the first fluid space.

The fluid distribution surface can be used in a horizontal, vertical or angled position and in annular, cylindrical, and hexahedral forms. The heat exchanger is especially compact when sheet metal plates and frames are used as enclosures for the first and second fluid spaces and is especially useful when used as absorbers, condensers, desorbers, and evaporators in an absorption refrigeration machine.

The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

Figure 1:
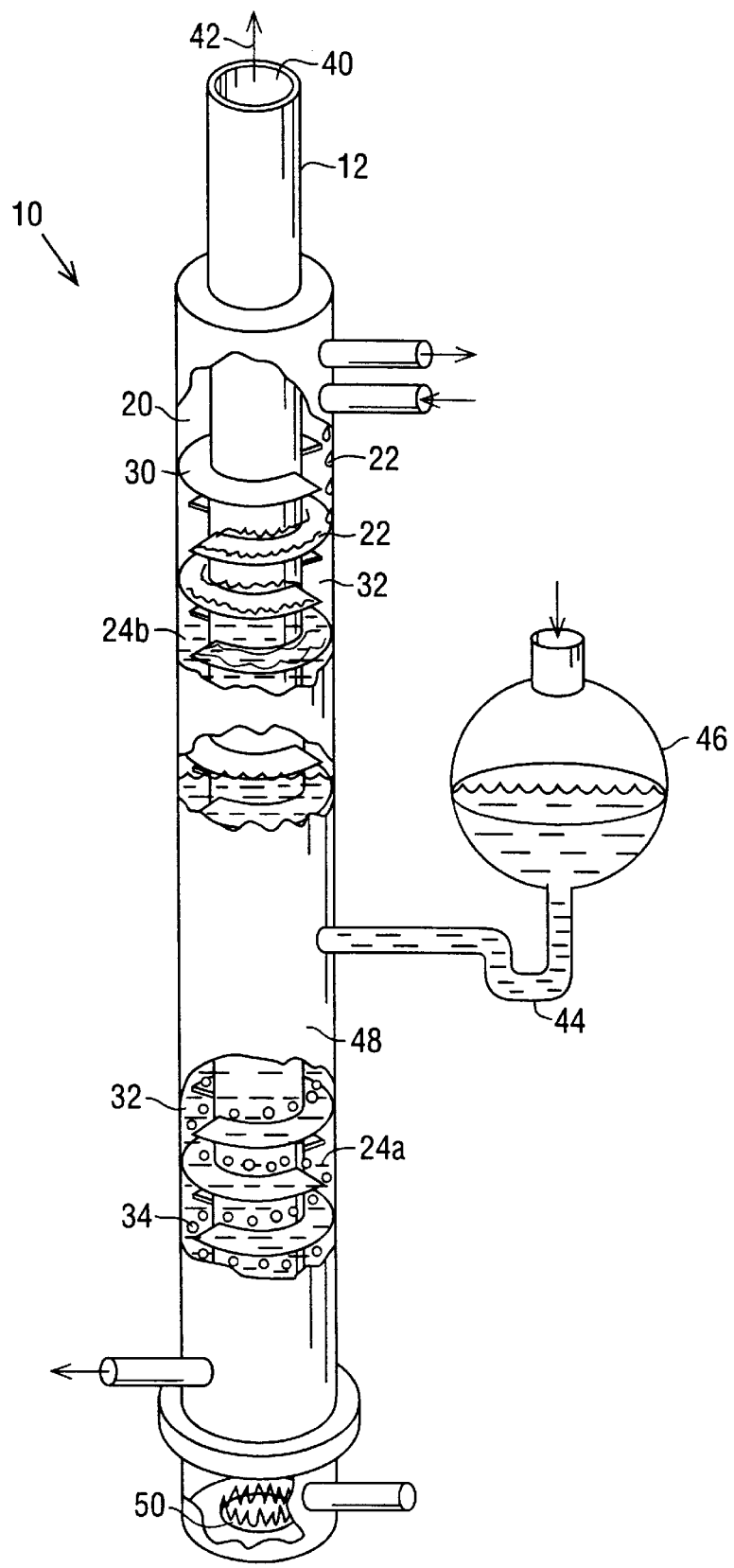
FIG. 1 is a partially cut away perspective view of a gas-fired desorber using a horizontal fluid distribution surface.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Figure 2:
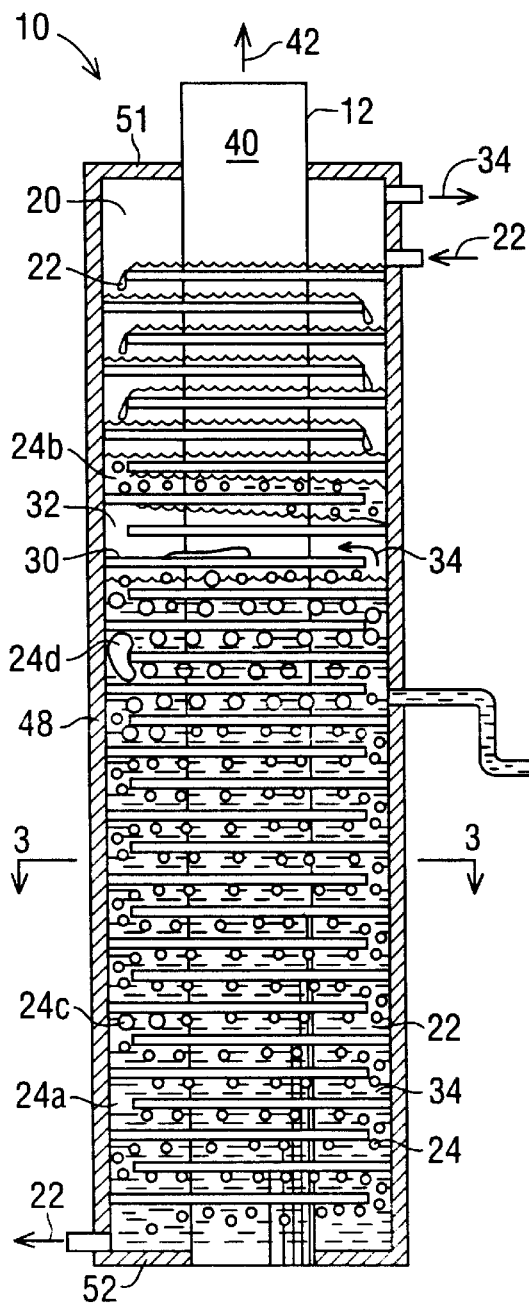
FIG. 2. is a cross sectional view of a gas-fired desorber with a horizontal fluid distribution surface.
Figure 3:
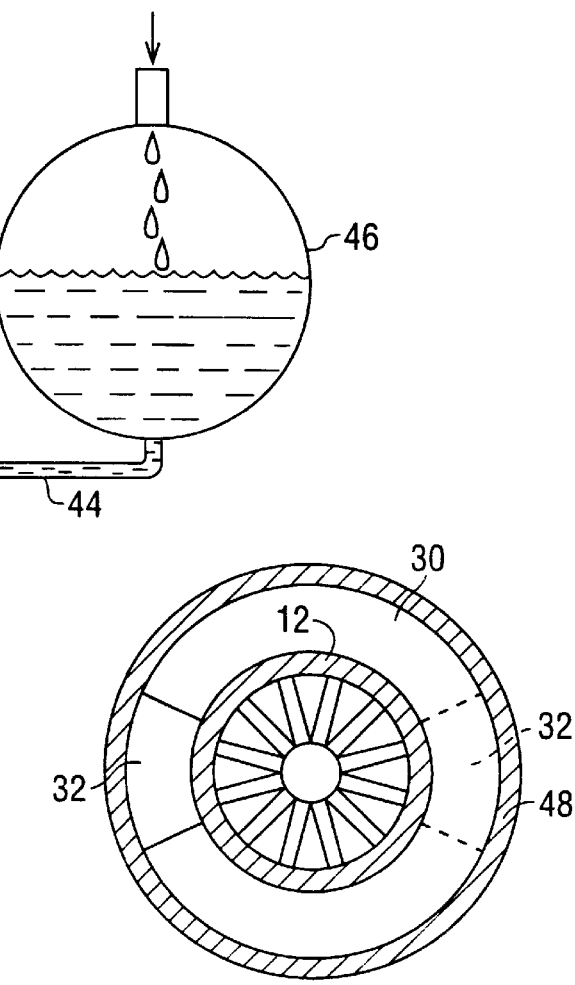
FIG. 3. is a cross section through 3—3 of FIG. 2.

With reference to the drawings and initially FIGS. 1–3, a heat exchanger 10 is shown having a substantially vertical surface such as vertical tube 12 that separates a first fluid containing space 20 from a second fluid containing space 40. The first fluid space contains: 1) a downward flowing liquid 22 in at least a partially flooded state, that is, in either a liquid filled volume state 24a or an intermittent dynamic "bridging" state 24b or some combination of the two, 2) an upward flowing gas such as vapor 34 at least partially contained in the downward flowing liquid 22 as shown at 24c and 24d (FIGS. 2) and 3) a fluid distribution surface 30. An aperture 32 in the fluid distribution surface 30 provides for and facilitates 1) the downward passage and distribution of the downward flowing liquid 22 and 2) the upward passage and distribution of the upward flowing gas (vapor) 34 in the first fluid space 20. The second fluid space 40 contains a fluid, typically suitable for heat-exchange, in liquid, gaseous and/or solid particulate form such as combustion products 42.

As used here, the term "partially flooded state" requires at least one of the two following conditions exist in the first fluid containing space 20. The first condition is a condition having a partially flooded or liquid-filled volume state in which a portion of the first fluid space 20 is filled with a liquid 24a having a downward movement through the first fluid space 20 with the liquid maintained at a relatively constant or filled level. As shown in FIGS. 1 and 2 this can be accomplished with a standpipe-type arrangement having appropriate tubing 44 and a vessel tank such as accumulator tank 46. It is not essential that the liquid exist in a continuous state throughout the liquid filled volume. As shown at 24d, sufficient vapor may exist at various locations in the vapor path so as to completely fill the fluid flow path. However such complete vapor filling of the liquid volume should exist only in portions of the liquid filled volume and cannot prevent completely the general downward flow of liquid 22. The second condition is a condition with a high liquid flow rate or a high gas flow rate or a combination of the two that causes the liquid to bridge across the first fluid space 20 as shown at 24b. Such a condition can occur only in a manner that does not preclude at least an intermittent (net) downward flow of liquid 22.

In FIGS. 1–3, the fluid distribution surface 30 is substantially perpendicular with respect to the vertical surface 12 separating the first fluid space 20 from the second fluid space 40. That is, the fluid distribution surface 30 is essentially a horizontal or flat plate. As shown in FIGS. 1–3, the first fluid space 20 is an annular space formed by an enclosure comprising the vertical surface 12 formed as an inner cylinder, an outer cylinder 48, a top 50 and a bottom 52. Fluid distribution surface 30 is annular in form with a segment removed to define aperture 32. A plurality of similarly shaped plates 30 are arranged in spaced-apart fashion within the first fluid space 20 so that aperture 32 alternates from one side of the annular first fluid space 20 to the other with each successive plate 30.

The configuration shown in FIGS. 1–3 is particularly effective when used as an evaporator or desorber (generator). The long liquid flow path as the liquid 22 flows downward through aperture 32 to the next lower fluid distribution plate 30, then horizontally along plate 30 to aperture 32 at the opposite side of the first fluid space 20 and then downward again through oppositely situated aperture 32 to the next lower plate 30 affords prolonged contact with the heat transfer surfaces of the device. These heat-transfer surfaces include 1) vertical surface 12 separating the first fluid space 20 from the second fluid space 40 with the second fluid space 40 containing, for example, hot combustion products 42, and 2) the fluid distribution plates 30 which are in heat transfer relation with the vertical surface 12. Similarly the long flow path and facilitated liquid vapor contact through the first fluid space 20 allows for improved mass transfer from the liquid to the vapor state.

When used as a desorber, the fluid distribution plates 30 also serve to maintain a good concentration gradient from the top to the bottom of the first fluid space 20. A 40 inch high annular space formed from a 3.5 inch diameter inner cylinder and a 6 inch diameter outer cylinder with a 2 inch vertical spacing between fluid distribution surfaces 30 produced a 5.9 wt % ammonia solution at the base of device 10 from a 46 wt % ammonia solution input liquid 22 (1.965 lb/min) and a 94.8 wt % ammonia output vapor 34 leaving at the top of device 10 using a gas burner 50 with an 87.260 Btu/hr gas input and an 83% combustion efficiency.

Figure 4:
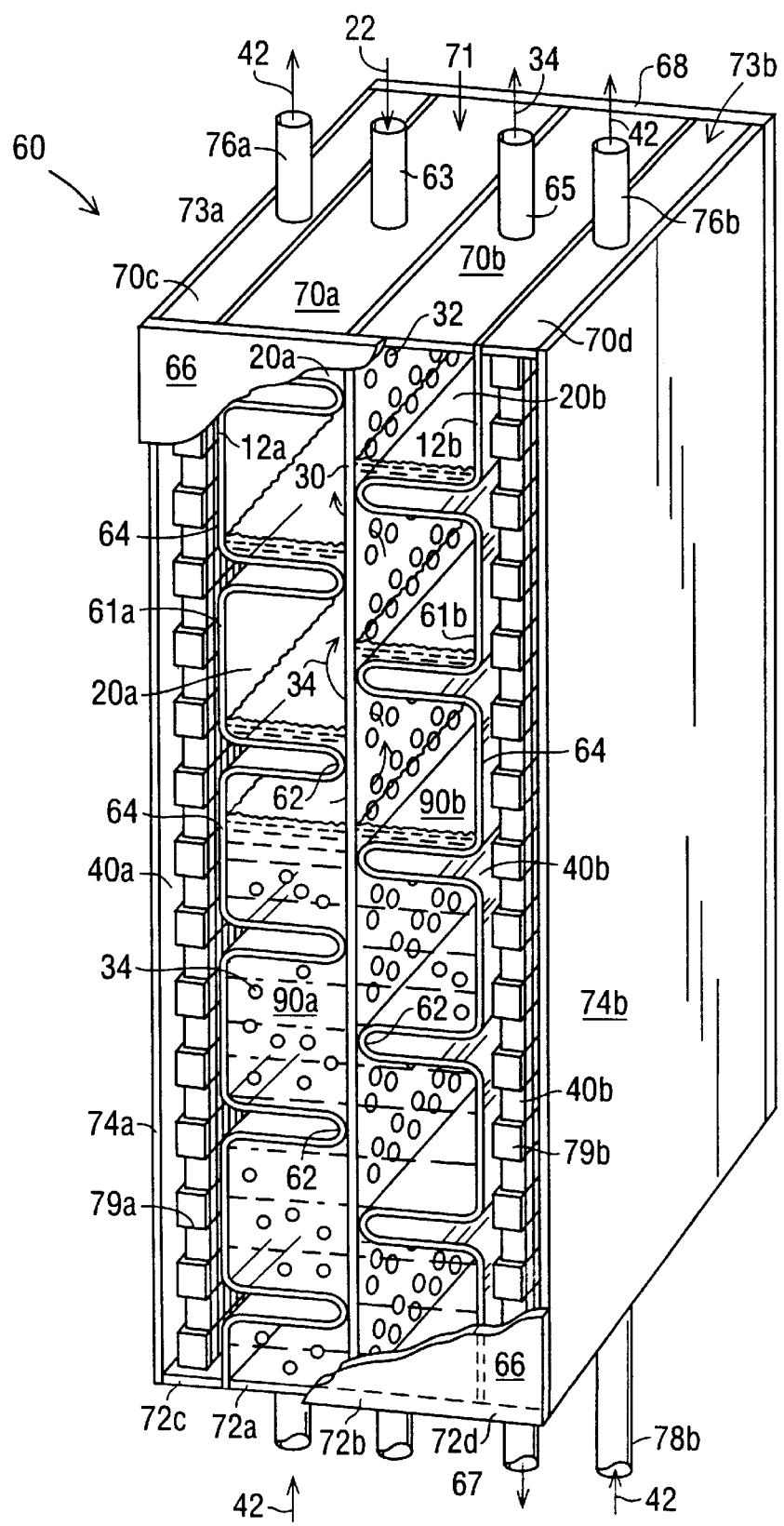
FIG. 4 is a partially cut away perspective view of a heat exchanger according to the present invention using a vertical fluid distribution surface with a corrugated fluid space separator.
Figure 5:
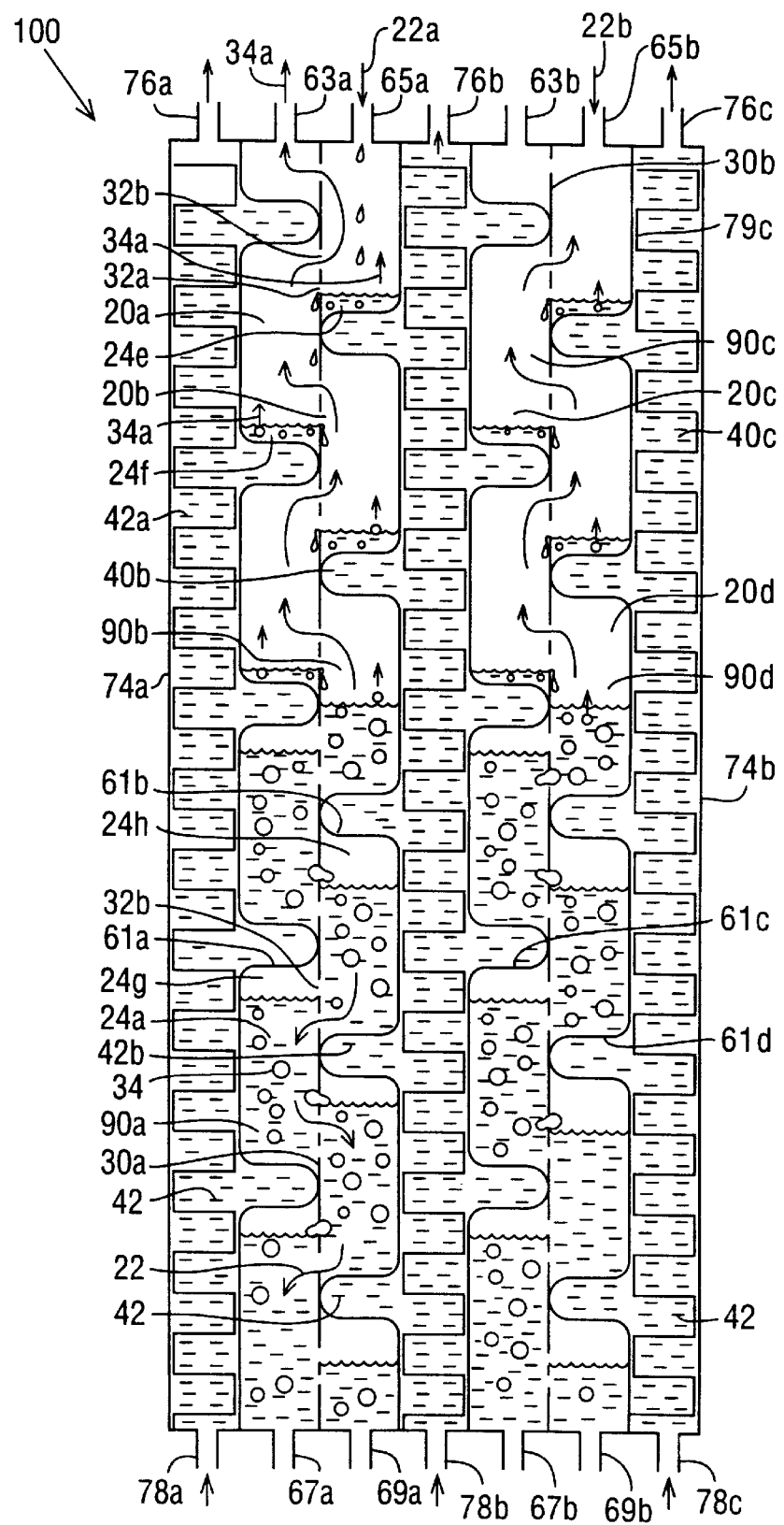
FIG. 5 is a cut away end view of a heat exchanger according to the present invention using vertical fluid distribution surfaces with corrugated fluid space separator crests in staggered alignment with respect to the vertical fluid distribution surface.
Figure 6:
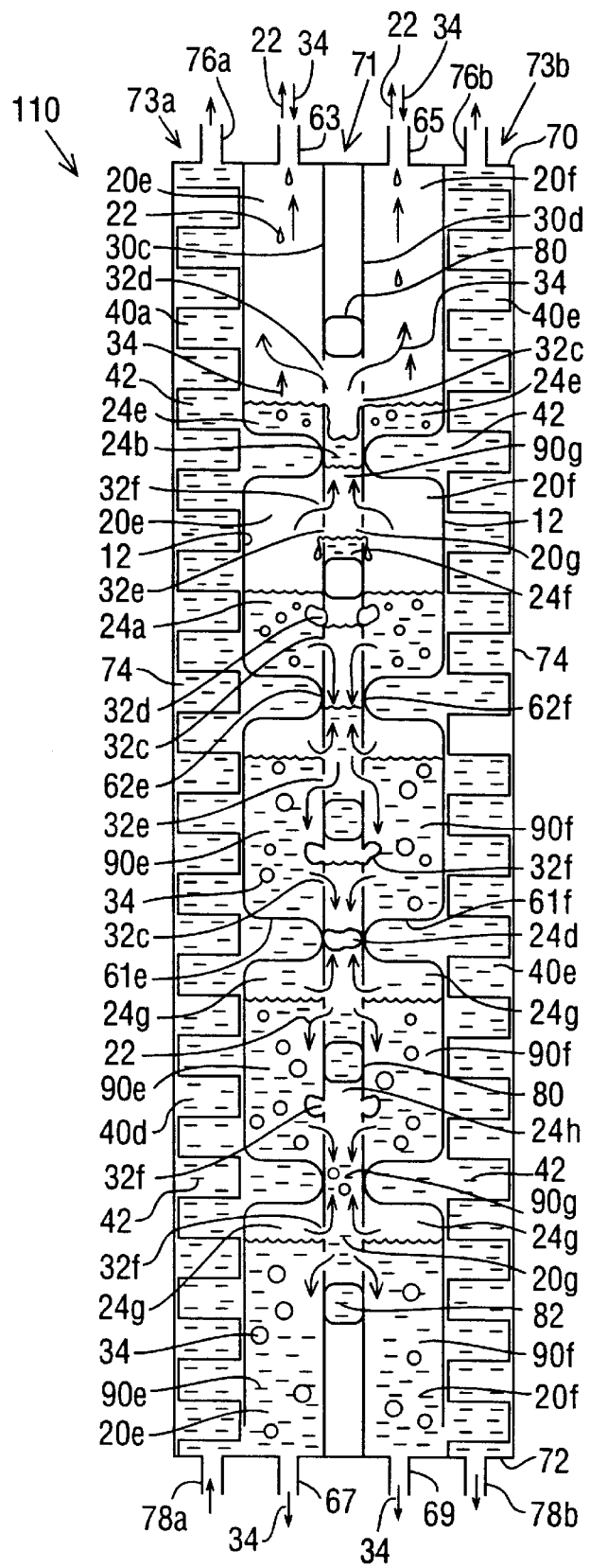
FIG. 6 is a cut away end view of a heat exchanger according to the present invention using vertical fluid distribution surfaces with corrugated fluid space separator crests in horizontal alignment with respect to the vertical fluid distribution surface.

FIGS. 4–6 illustrate embodiments of the present invention in which a substantially vertical fluid distribution surface 30 containing rows of apertures 32 is used to facilitate the downward passage and distribution of the downward flowing liquid 22 and the upward passage and distribution of an upward flowing gas 34. (To simplify the detail of the various devices employed with the present invention, identical numbers are often used to identify key components that perform similar or identical functions in the various embodiments.) As shown in FIG. 4, the substantially vertical surfaces 12a, 12b of device 60 that separate the first fluid space 20a, 20b from the second fluid space 40a, 40b are corrugated sheets 61a, 61b with folds, that is, parallel and alternating horizontal ridges (crests) 62 and elongated grooves 64.

The first fluid space 20a, 20b is defined by an enclosure 71 comprising vertical surfaces 12a, 12b (corrugated sheets 61a, 61b), a front 66, a back 68, tops 70a, 70b and bottoms 72a, 72b. Conduits 63, 65, and 67 provide openings at the top and bottom of enclosure 71. It is to be realized that in certain applications of the embodiments of the present invention such as device 60, only a single opening may be necessary and that a single opening may carry more than one fluid, different phases, and/or both input and output flows. For example, if device 60 is operating as an evaporator, liquid could be admitted through an opening in the top, e.g., conduit 63, with the vapor also existing through the same opening. In many applications it is desirable to keep the components and/or phases separate and therefore, and as shown, multiple openings are used. For example, in a desorber application, a strong liquid solution, e.g., a solution of ammonia and water, enters through upper conduit 63, ammonia vapor leaves through upper conduit 65, and relatively pure water leaves through lower conduit 67.

The second fluid space 40a, 40b is defined by enclosures 73a and 73b. Enclosure 73a comprises vertical surface 12a (corrugated sheet 61a), side 74a, front 66, back 68, top 70c and bottom 72c. Enclosure 73b comprises vertical surface 12b (corrugated sheet 61b), side 74b, front 66, back 68, top 70d and bottom 72d. Depending on the application, an extended heat transfer surface such as offset strip fins 79a, 79b may be placed within the second fluid space 40a, 40b, i.e., in enclosure 73a, 73b or both, to afford enhanced heat transfer with a fluid 42 flowing through second fluid space 40a, 40b.

It is to be realized that the device 60 may be operated without an extended heat transfer surface such as offset strip fin 79 and, in certain instances, it is not necessary to close the second fluid space by providing an enclosure. In such situations, the ambient environment can serve as a fluid in open fluid space 40 that provides heat to the first fluid space 20 or serves as a heat sink for accepting heat from the first fluid space 20.

Conduits 76a, 76b and 78a, 78b provide openings for the ingress and egress of a heat transfer fluid 42 in second fluid space 40a, 40b. Typically such openings are located at or near the top 70c, 70d and bottom 72c, 72d of the second fluid space 40a, 40b. However it is to be realized that other opening locations may be used depending on the function and configuration of the device.

The various components are attached to each other to form various fluid enclosures using suitable joining techniques. For example, when the components are of carbon steel, they can be joined using a suitable brazing process. In this. regard, it is to be noted that the crests 62 of the corrugated sheet 61a, 61b are suitably joined to the vertical fluid distribution plate 30 and that the edges of the corrugated sheet 61a, 61b and the distribution plate 30 are joint to the front 66 and back 68 to form fluid cells 90 within the first fluid space 20a, 20b with one or more fluids and/or phases passing only though apertures 32 in distribution surface 30. Although a physical joining technique such a brazing is typically used, such joining is not absolutely essential. However, it is to be realized that the fit between the various components must be sufficiently tight to prevent the flow of gases and liquids there between, for example, crest 62 and fluid distribution plate 30.

As will be readily apparent to those skilled in the art, the various components may be formed in a single piece or as individual segments depending on manufacturing and/or operational requirements. For example, top segments 70a, 70b, 70c, and 70d could also be formed and used as a single plate.

One of the features of the present invention is the use of sheet metal components that may be inexpensively fashioned from flat sheet metal stock. This has the distinct advantage of readily dividing and stacking first and second fluid enclosures to achieve appropriate heat exchange properties for a particular application within a compact overall structure. Thus in FIG. 5, the first fluid containing space 20 has been divided into two portions 20a, 20b and 20c, 20d. Likewise, the second fluid containing space 40 has been divided into a third portion 40c with respect to the device shown in FIG. 4. That is, additional first fluid containing space 20c, 20d and second fluid space 40c has been added to the configuration shown in FIG. 4 to give the overall device 100. This has been achieved by adding corrugated sheet 61c, a second fluid distribution plate 30b, corrugated sheet 61d and offset strip fin 79c between offset strip fin 79b and side 74b. As with corrugated sheets 61a, 61b, the crests of corrugated sheets 61c, 61d are offset with respect to each other to form offset, alternating cells 90c, 90d with respect to fluid distribution plate 30b. As with fluid distribution plate 30a, rows of apertures 32 are formed in fluid distribution plate 30b to provide for the upward flow of gas 34 and the downward flow of liquid 32. Conduits 76c and 78c provide openings to second fluid space 40c while conduits 63a, 67a and 63b, 67b provide upper and lower openings to first fluid space 20a and 20c, respectively, and conduits 65a, 67b and 65b, 67b provide openings to first fluid space 20b and 20d, respectively.

As illustrated and with device 100 operating as a desorber, liquid portion 22a enters the opening in upper conduit 65a and flows downward collecting in liquid pool 24e which facilitates heat exchange via corrugated vertical plate 61b from hot fluid 42b within second fluid space 40b thereby promoting desorption of vapor 34b. On reaching a sufficiently high level, liquid 22a leaves via a row of lower apertures 32a and flows downward to liquid pool 24f which facilitates heat exchange via corrugated vertical plate 61a with hot fluid portion 42a within second fluid space 40a thereby promoting further desorption of vapor 34a. Vapor portion 34a flows upward through rows of upper apertures 32b finally leaving through the opening form by conduit 63a.

As liquid 22a flows downward it accumulates within the first fluid space to form liquid filled volume 24a, i.e., downward flowing liquid 22 substantially occupies the volume of cells 90 of first fluid containing space 20a, 20b in the lower portion of the device. Contract of liquid 22a with vertical surface 61a, 61b facilitates heat transfer from fluid 42a, 42b in second fluid space 40a, 40b. Desorption continues with vapor bubbles 34a rising in surrounding downward flowing liquid 22a. Rising vapor 34a accumulates in vapor pocket 24g of fluid space cell 90a. When sufficient vapor has accumulated, it leaves vapor pocket 24g through a row of upper apertures 32b and continues to flow upward accumulating in vapor pocket 24h at the top of alternating and opposite offset cell 90b and then again passing outward and upward in a serpentine path through the row of upper apertures 32b in fluid distribution plate 30a to cell 90a.

The fluid distribution surface 30 contains double rows of apertures 32 with the upper row of apertures 32b used for the passage of upward flowing gas 34 and the lower row of apertures 32a used for the downward flow of liquid 22. Each cell 90 has two double rows of apertures 32, an upper double row of apertures with the upper row of apertures 32b of the double row used for the outward passable of upward flowing gas 34 from cell 90 and the lower row of apertures 32a of the upper double row used for the inward passage of downward flowing liquid into cell 90. A lower double row of apertures 32 has an upper row of apertures 32b for the inward passage of gas 34 and a lower row of apertures 32a for the outward flow of liquid 22. As shown in FIGS. 4 and 5, the lower double row of apertures 32 of cell 90a is the upper double row of apertures 32 for lower offset cell 90b located on the opposite side of fluid distribution surface 30a. Although the apertures 32 are shown as double rows, it is to be realized that a single row of large apertures may also be used with upward flowing gas 34 and downward flowing liquid 22 passing though the same apertures 32.

Depending on the application, the two rows of apertures 32 (one row for liquid and the other for vapor) may be staggered with respect to each other as shown in FIG. 4 in order to segregate and maintain liquid 22 and vapor 34 in separate flows. Alternatively the rows of apertures may be placed directly above each other when liquid and vapor mixing are desired as might be the case in of an absorber when good mass transfer from the vapor 34 to the liquid 22 is desired. It is noted that the apertures may be of any shape including an aperture formed as a single long slot. However, as noted previously smaller and multiple apertures promote more effective mass transfer by fluid mixing and providing renewed larger surface areas.

As shown, FIG. 5 operates as a desorber unit on both the left and right sides of the unit, i.e., first fluid space 20a, 20b (left side)and 20c, 20d (right side) and the functions and flows described for the left side are equally applicable to the right side. However, it is to be realized that different processes can take place on the left side 20a, 20b and the right side 20c, 20d with heat exchange between the two processes. For example, the heat released from an absorption process taking place on the left side in 20a,20b could be used to provide heat to a desorption process taking place on the right side in 20c, 20d of device 100. As illustrated, the simple sheet metal construction enables the ready assembly of compact, multi-function, heat-transfer devices.

FIG. 6 illustrates another embodiment of the present invention using a vertical fluid distribution surface 30 in which two fluid distribution plates 30c, 30d are used and separated by tubular members 80 to form first fluid space 20g. Corrugated sheets 61e, 61f separate the first fluid space 20e, 20f from second fluid space 40d, 40e. Crests 62e, 62f of corrugated sheets 61e, 61f are horizontally aligned across from each other to form first fluid cells 90e, 90f that are directly opposite each other and at the same level rather than offset with respect to each other as in embodiments 60 and 100 of FIGS. 4 and 5. Sides (corrugated sheets) 61e, 61f, top 70, bottom 72, and a front and back (not shown: but see FIG. 4 front 66 and back 68) provide an enclosure 71 for first fluid space 20e, 20f, 20g while corrugated sheets 61e, 61f, sides 74, top 70, bottom 72 and a front and back (not shown) provide enclosures 73a, 73b for second fluid space 40d, 40e. Conduits 76a, 78a provide openings to enclosure 73a while conduits 76b, 78b provide openings to enclosure 73b for second fluid space fluid 42. Conduits 63, 65, 67, 69 provide openings to first fluid space 20e, 20f, it being noted that fewer or more openings maybe used depending on the processes carried out within the first fluid space 20e, 20f, 20g and the separation of flows, fluids, and/or phases desired. Tubular separator 80 may be connected to form a continuous passage and fluid 82 passed there through for heat exchange purposes. An upper double row of apertures comprising upper vapor apertures 32f and lower liquid apertures 32e and a lower double row of apertures comprising upper vapor apertures 32d and lower liquid apertures 32c provide downward passage and distribution of downward flowing liquid 22 and upward passage and distribution of upward flowing gas 34 within first fluid space 20e, 20f, and 20g.

With embodiment 110 operating as a desorber, a strong solution (here defined as an absorbent liquid with absorbed gas) 22 enters device 110 through upper openings provided by conduits 63 and 65 into the first fluid space 20e, 20f and accumulates in liquid pools 24e where heat from fluid 42 in second fluid space 40d, 40e passes through vertical surface 12 (corrugated sheets 61e, 61f) to heat downward flowing liquid 22 in pools 24e and release upward flowing gas 34 from strong solution 22. When liquid 22 rises to the level of the row of liquid apertures 32c, it flows through apertures 32c and then downward along the inside surfaces of fluid distribution plates 30c, 30d to accumulate in accumulation pool 24f. Liquid 22 rises in the accumulation pool 24f until it reaches the level of lower liquid apertures 32e where it spills out into cells 90e, 90f and accumulates in a liquid filled volume state 24a.Liquid 22 continues to flow downward in each of the lower liquid filled cells 90, entering each cell 90e, 90f through upper liquid apertures 32e and leaving through lower liquid aperture 32c, flowing through cell 90g in first fluid space 20g , and then entering the next lower cells 90e, 90f through upper liquid apertures 32e and so forth until ultimately it flows out of first fluid space 20e, 20f through openings in lower conduits 67 and 69 as a weak solution, i.e., here defined as an absorbent liquid substantially devoid of absorbed gas 34.

During its downward passage through cells 90e, 90f , 90g, heat transferred from fluid 42 in second fluid space 40d, 40e via vertical surfaces (corrugated plates) 61e, 61f, causes absorbed gas 34 to be desorbed from the strong solution as bubbles that flow upward within liquid 22 in the liquid filled first fluid spaces 20e, 20f, 20g (divided into cells 90e, 90f , 90g, respectively). On reaching the top of cells 90e, 90f , vapor 34 collects to form a vapor pockets 24g. When sufficient vapor accumulates in the vapor pockets 24g, it leaves through upper vapor apertures 32f into first fluid space 20g where it accumulates in vapor pocket 24h until it reaches upper apertures 32f of the double lower row of apertures through which vapor 34 moves back into cells 90e, 90f and then upward to accumulate in the next vapor pockets 24g. On reaching the upper level of the liquid filled volume state 24a, vapor 34 continues to flow upward in a serpentine path through upper apertures 32d and 32f until it leaves via openings in onduits 63 and 65.

As shown at 24d, vapor 34 may bridge completely across the first fluid space preventing the downward flow of liquid for a brief moment. Such a condition exists only intermittently as vapor 34 dissipates into the large volume of cells 90e, 90f through pertures 32f. Similarly liquid 22 may form a liquid bridge 24b that dissipates on reaching apertures 32 located above or below liquid bridge 24b. As illustrated both outgoing vapor 34 and incoming liquid 22 share the same opening. However it is to be realized that separate openings could be used for each flow.

Figure 9:
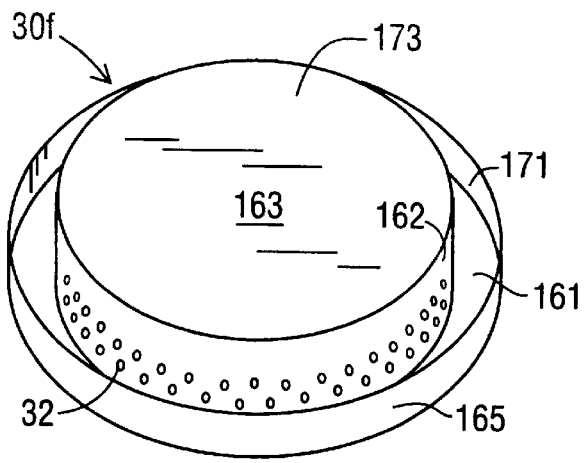
FIG. 9 is a perspective view of a cylindrical fluid distribution surface according to the present invention with fluid distribution apertures in a vertical surface.
Figure 10:
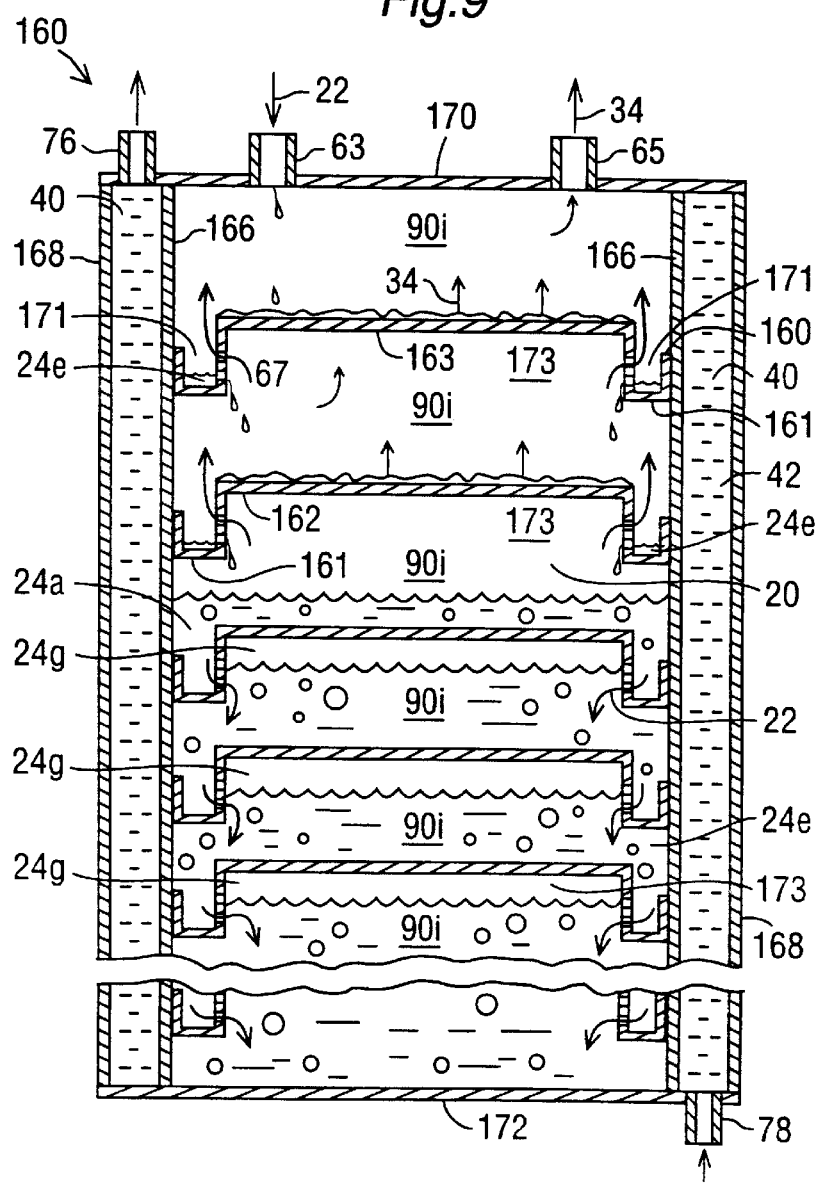
FIG. 10 is a partial cross-sectional view of a cylindrical heat exchange device according to the present invention using the cylindrical fluid distribution surface of FIG. 9.
Figure 11:
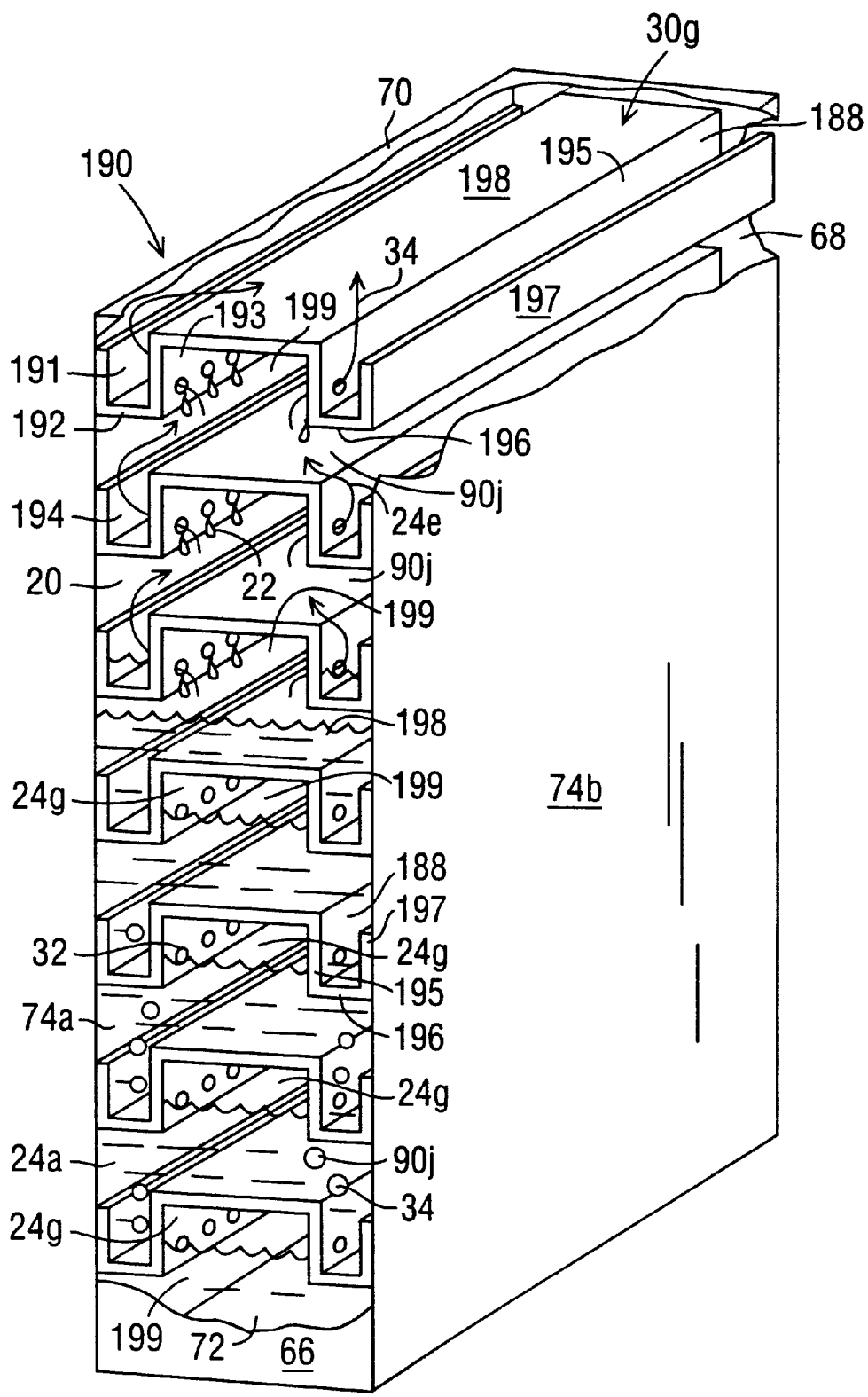
FIG. 11 is a partially cut away perspective view of a hexahedral embodiment of the present invention using rectangular segments to form the fluid distribution surfaces with fluid distribution apertures located in a vertical surface.

FIGS. 7–11 illustrate additional embodiments of a more complex fluid distribution surface 30 in which the fluid distribution apertures 32 are formed in a vertical surface of the complex configuration. These embodiments include an overall annular configuration (FIGS. 7–8), a cylindrical configuration (FIGS. 9–10) and a hexahedral configuration (FIG. 11).

Figure 7:
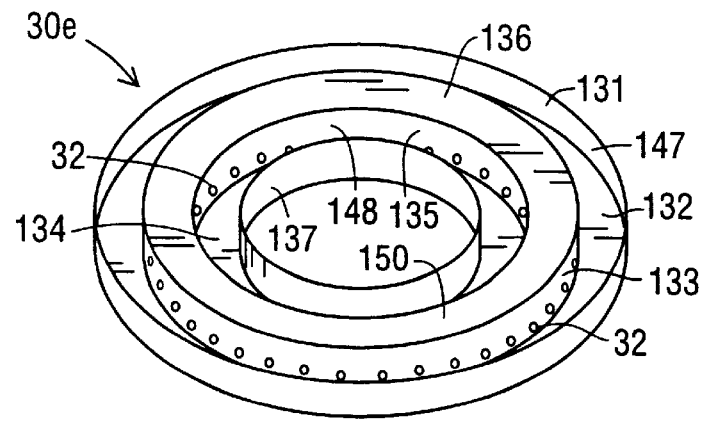
FIG. 7 is a perspective view of an annular fluid distribution surface according to the present invention with fluid distribution apertures in a vertical surface.
Figure 8:
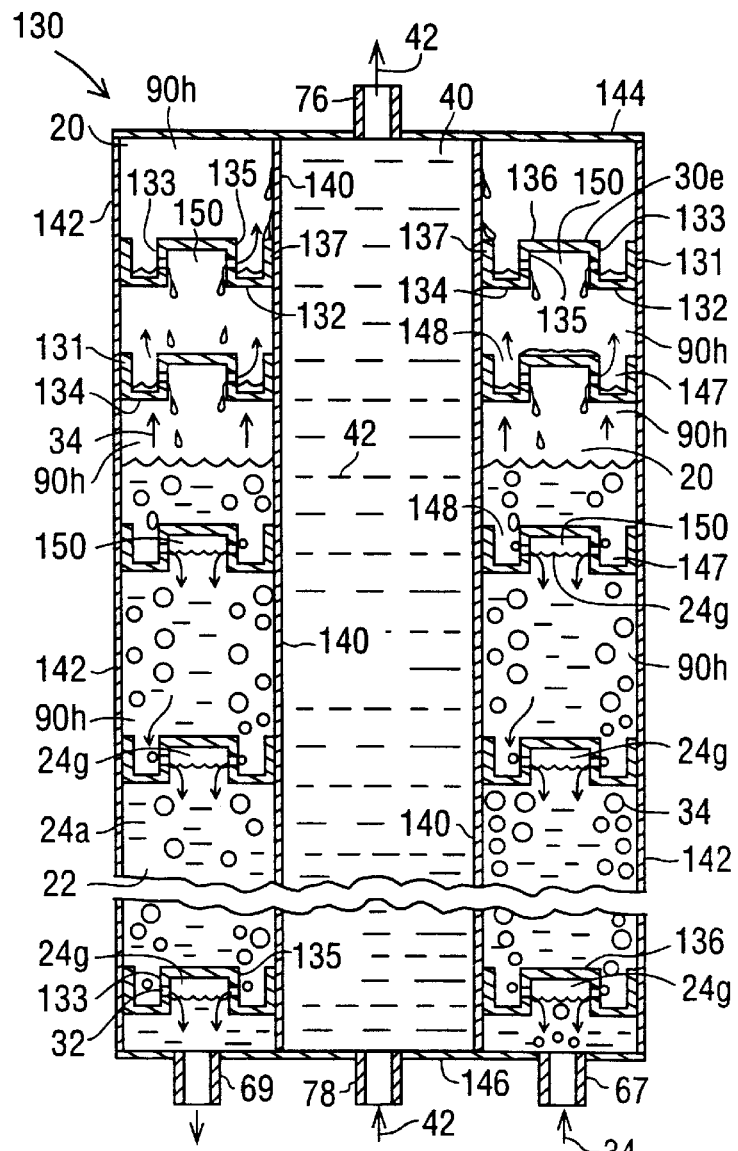
FIG. 8 is a partial cross-sectional view of an annular heat exchange device according to the present invention using the annular fluid distribution surface of FIG. 7.

FIGS. 7–8 illustrate an annular embodiment 130 of the fluid distribution surface 30. As detailed in FIG. 7, the fluid distribution surface 30e comprises four cylindrical surfaces 131, 133, 135, and 137 of increasing radius. Cylindrical surfaces 131 and 133 are joined at the bottom by a horizontal annular surface 132 to form outer trough 147. Similarly cylindrical surfaces 135 and 137 are also joined at the bottom by annular surface 134 to form inner trough 148. Cylindrical surfaces 133 and 135 are joined at the top by horizontal annular surface 136 to form an inverted trough 150. One or more rows of apertures 32 are formed in vertical cylindrical surfaces 133 and 135.

Referring to FIG. 8, a first fluid space 20 is defined by inner cylinder 140, outer cylinder 142, top 144 and bottom 146 with vertical inner cylinder 140 separating first fluid space 20 from second fluid space 40 which is defined by inner cylinder 140, top 144 and bottom 146. Although not shown, it is to be realized that a closed outer fluid space 40 (not shown; but see FIG. 10) may also be created around the circumference of outer cylinder 142. A plurality of annular fluid distribution surfaces 30e are placed in spaced-apart arrangement within first fluid space 20 to form annular cells 90h.

Typically fluid distribution surface 30e is stamped from carbon steel sheet metal with cylindrical surfaces 131 and 137 joined to inner and outer cylinders 140 and 142 using suitable brazing techniques. However, it is to be realized that cylindrical surfaces 131 and 137 may be shortened or eliminated with inner and outer cylinders 140 and 142 serving as one of the walls of troughs 147 and 148. When cylindrical surfaces 131 and 137 are eliminated, the edges of horizontal annular surfaces 132 and 134 are attached directly to outer and inner cylinders 140 and 142, respectively. The use and attachment of cylindrical surfaces 131 and 137 to outer and inner cylinders 142 and 140, respectively, is generally preferred in order to increase heat transfer efficiency with fluid 42 in second fluid space 40.

Embodiment 130 is shown operating as a condenser in which gas (vapor) 34 enters first fluid space 20 through an opening provided by conduit 67. As the vapor 34 contacts the walls 140 and 142 of the first fluid space 20 and the fluid distribution surfaces 30e, heat is transferred from vapor 34 to these surfaces resulting in the formation of condensate 22. Vapor 34 continues to condense until a steady-state liquid filled volume 24a is achieved within first fluid space 20. As non-condensed vapor 34 rises in condensate 22, it accumulates in inverted trough 150 to form vapor pocket 24g until sufficient vapor has accumulated after which vapor 34 begins to bubble through apertures 32 and then move upward in downward flowing condensate liquid 22 into the next higher first fluid space cell 90h. The position of the apertures 32 directs vapor bubbles 34 against the vertical surfaces (cylinders 140 and 142 and inner and outer cylindrical surfaces 131 and 137) to promote effective heat exchange with these surfaces and fluid 42 in second fluid space 40. Apertures 32 also serve to break vapor 34 into small discrete bubbles thereby promoting effective mass transfer from the vapor to the liquid state.

The vapor 34 continues upward in first fluid space cell 90h reaching the next upper distribution plate 30e where another vapor pocket 24g forms and after sufficient vapor 34 has accumulated, it bubbles through apertures 32 into the next cell 90h where the process is repeated. On reaching the surface of the liquid filled volume 24a, the vapor 34 continues to move upward condensing on the upper portions of cylindrical walls 140, 142 and upper distribution plates 30e. Condensate 22 accumulates in troughs 147, 148 until apertures 32 are reached at which point liquid (condensate) 32 spills through apertures 32 and into the next lower first liquid space cell 90h. On reaching the liquid filled volume region 24a, condensate 22 continues to flow downward in a serpentine path through apertures 32 of each successive lower distribution plate 30e until it leaves via an opening formed by conduit 69. To maintain relatively constant vapor velocity as the condensing vapor 34 flows upward in the device, the vertical spacing between successive distribution plates 32e is incrementally reduced in going from the bottom to the top of device 130. A single row of apertures for both liquid and vapor is used to obtain good mixing and resulting mass transfer from the vapor to the liquid state.

FIGS. 9–10 illustrate a cylindrical embodiment 160 of fluid distribution surface 30. As shown in FIG. 9, the fluid distribution surface 30f comprises two vertical cylindrical surfaces 162 and 165 of increasing radius joined at their bottom edges by horizontal annular surface 161 to form trough 171. A circular surface 163 is joined to the upper edge of vertical cylindrical surface 162 to form inverted trough 173. A double row of apertures 32 with the upper row staggered with respect to the lower row is formed in vertical cylindrical surface 162.

A cylindrical first fluid space 20 is defined by cylinder 166, top 170, and bottom 172 with vertical cylinder 166 separating first fluid space 20 from annular second fluid space 40 defined by inner cylinder 166, outer cylinder 168, top 170 and bottom 172. A plurality of annular fluid distribution surfaces 30f are placed in spaced-apart arrangement within first fluid space 20 to form cylindrical cells 90i.

Typically fluid distribution surfaces 30f are stamped from carbon steel sheet metal with cylindrical surfaces 165 joined to cylinder 166 using a suitable brazing technique. Cylindrical surface 165 may be shorted or eliminated with cylinder 166 serving as the outer wall of trough 171 and the outer edge of horizontal annular surface 161 joined directly to cylinder 166. Generally cylindrical surface 166 is preferred in order to facilitate device 160 fabrication and improve heat transfer with the fluid 42 in annular second fluid space 40.

Embodiment 160 is shown operating as an evaporator in which a liquid 22 enters first fluid space 40 through an opening in conduit 63. Liquid spreads over the circular plate 163 of fluid distribution surface 30f from which it acquires heat effecting initial evaporation. Remaining liquid continues to flow downward collecting in liquid accumulation pools 24e in trough 171 where on rising to a sufficient level spills out through the lower row of apertures 32 onto the circular plate 163 of the next lower fluid distribution surface 30f where additional evaporation takes place and the remaining liquid 22 continues downward to repeat the process and eventually join liquid 22 in liquid filled volume state 24a where liquid continues to flow downward to replace liquid mass lost to the evaporation process taking place as a result of heat transfer through cylinder 166 and fluid distribution plate 30f.

Vapor 34 produced by the evaporation process rises in bottom first fluid space cell 90i and collects in a vapor pocket 24g beneath inverted trough 173 and after sufficient vapor accumulates, it passes through the upper row of apertures 32 in vertical cylindrical surface 162 of fluid distribution plate 30f into the next cell 90i where the process is repeated. On reaching the surface of the liquid filled volume 24a, the vapor 34 continues to move upward through succeeding cells 90i via the apertures in fluid distribution surfaces 30f until it exists through an opening in conduit 65. To maintain relatively constant vapor velocity as greater amounts of vapor accumulate in each succeeding upper cell 90i, the vertical spacing between successive distribution plates 32f is incrementally increased in going from the bottom to the top of device 160.

FIG. 11 is a partial embodiment of the present invention that illustrates a hexahedral configuration in which the first fluid space 20 is defined by sides 74a, 74b, front 66, back 68, top 70 and bottom 72. Openings for ingress and egress of fluids to the first fluid space (not shown) are provided according to the requirements of the process carried out within the first fluid space.

The fluid distribution plates 30g are formed by bending or forming a rectangular piece of sheet metal into the requisite shape. Vertical rectangular sections 191, 193 are joined to horizontal bottom rectangular piece to form U-shaped trough 194. Similarly vertical rectangular pieces 195 and 197 are joined to horizontal bottom rectangular piece 196 to form U-shaped trough 188. Finally the upper edges of vertical rectangular pieces 193 and 195 are joined to horizontal rectangular top piece 198 to form inverted trough 199. Rows of apertures 32 are formed in vertical sections 193 and 195.

As with previous embodiments, device 190 operates with a downward flowing liquid 22 in a liquid filled condition 24a with liquid accumulation pools 24e formed in troughs 188 and 194 spilling liquid 22 into the next lower first fluid cell 90j through apertures 32. Gas (vapor) 34 in the form of bubbles rises within the lower liquid filled volume 24a to accumulate in vapor pockets 24g formed in inverted trough 199 and on sufficient accumulation is broken by apertures 32 into small bubbles that again rise in the next upper fluid space cell 90j. On reaching the surface of the liquid filled volume 24a, vapor 34 continues to move upward in a serpentine fashion passing though the apertures of each higher distribution plate 30g.

Figure 12:
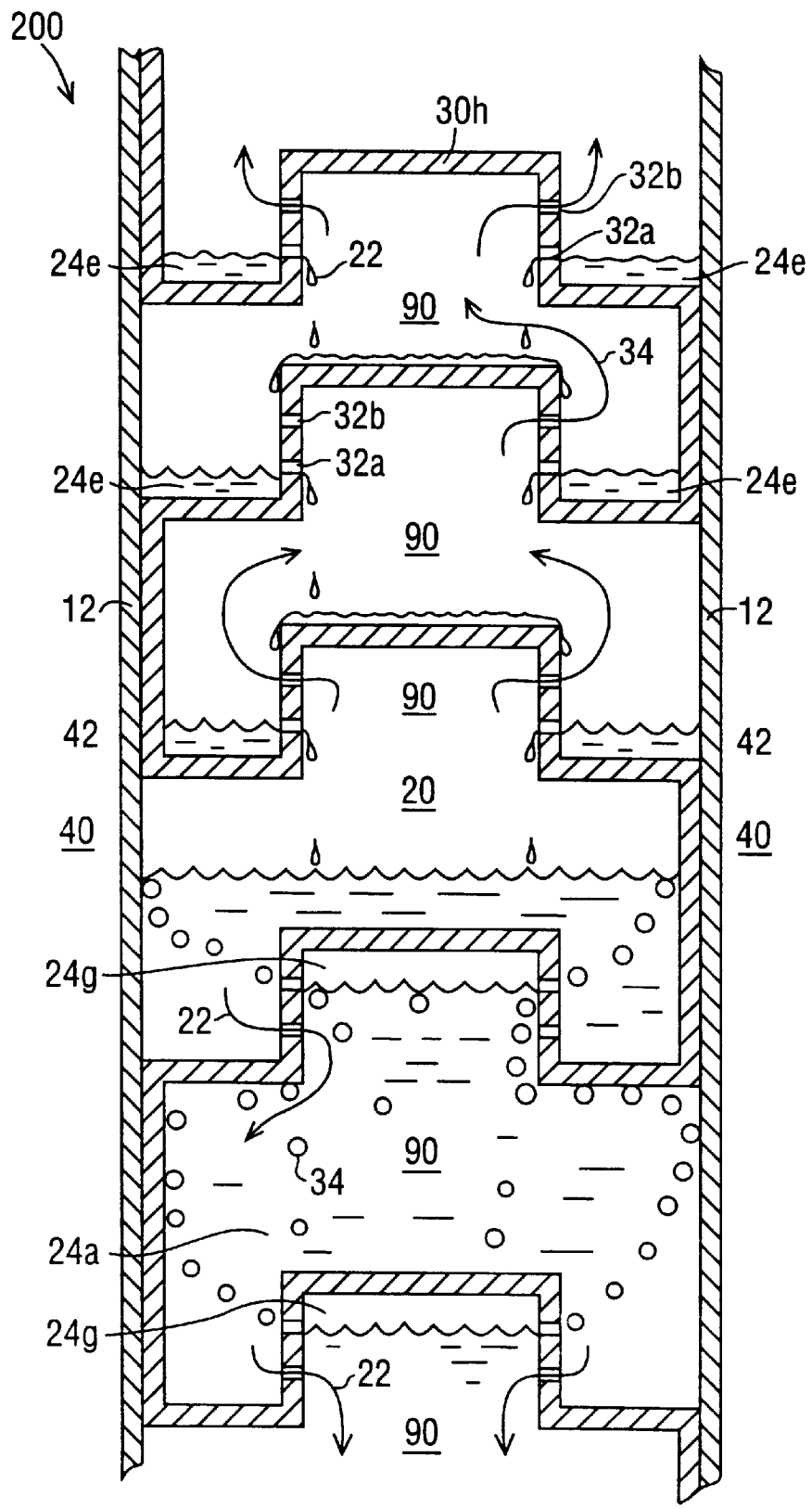
FIG. 12 is a partial end view of an embodiment of the current invention using fluid distribution surfaces with apertures in vertical surfaces formed from a single piece of sheet metal.

As shown in FIG. 12, one of the features of the present invention is the use of a single piece of sheet material to form distribution plates 30. This is especially effective when an overall hexahedral first fluid space 20 is used. As has been explained in detail above, 24a refers to a liquid filled volume state, 24e is a liquid accumulation pool, 24g is a vapor pocket, 22 is a downward flowing liquid, 34 is an upward flowing vapor (gas), 20 is the first fluid space which is divided into first fluid space cells 90, 12 is a vertical wall separating the first fluid space 20 from a second fluid space 40 containing fluid 42, and 32 designates apertures in distribution plate 30h with 32a designating lower (liquid flow) apertures and 32b designating upper (gas flow) apertures.

Figure 13:
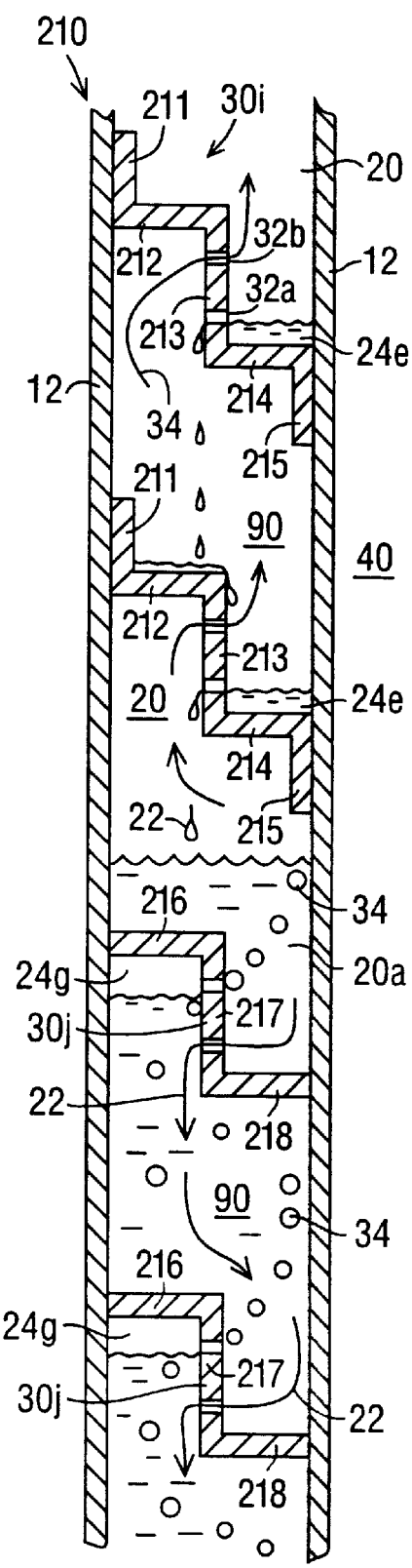
FIG. 13 is a partial end view of an embodiment of the current invention using two variations of a fluid distribution surface in the form of a "Z" with apertures in a single vertical surface at each horizontal level.

FIG. 13 illustrates additional embodiments of distribution plate 30. Here the distribution plates 30i, 30j are essentially half of the basic plate shown in FIGS. 11 and 12 and are particularly useful when a thinner first fluid space 20 is desired. Generally the overall fluid distribution within the fluid spaces is the same as that shown in FIG. 12 with similar reference numerals for similar features. The upper two distribution plates 30i comprise three vertical sections 211, 213, 215 joined to two horizontal sections to give an overall stair step type configuration. The uppermost and lower most vertical sections can be eliminated to give the "Z" shaped distribution surface designated as distribution plate 30j.

As shown in FIGS. 7–13, apertures 32 are typically placed close to the vertical surface (e.g., 140, 142 in FIG. 8, 166 in FIG. 10, 74a, 74b in FIG. 11, and 12 in FIG. 12) that separates the first fluid space 20 from the second fluid space 40 in order to promote effective heat transfer with the fluid 42 in the second fluid space 40. Apertures 32 may be formed in various shapes and formed into rows to promote or restrain mass transfer among the fluids within the first fluid space 20.

Figure 14:
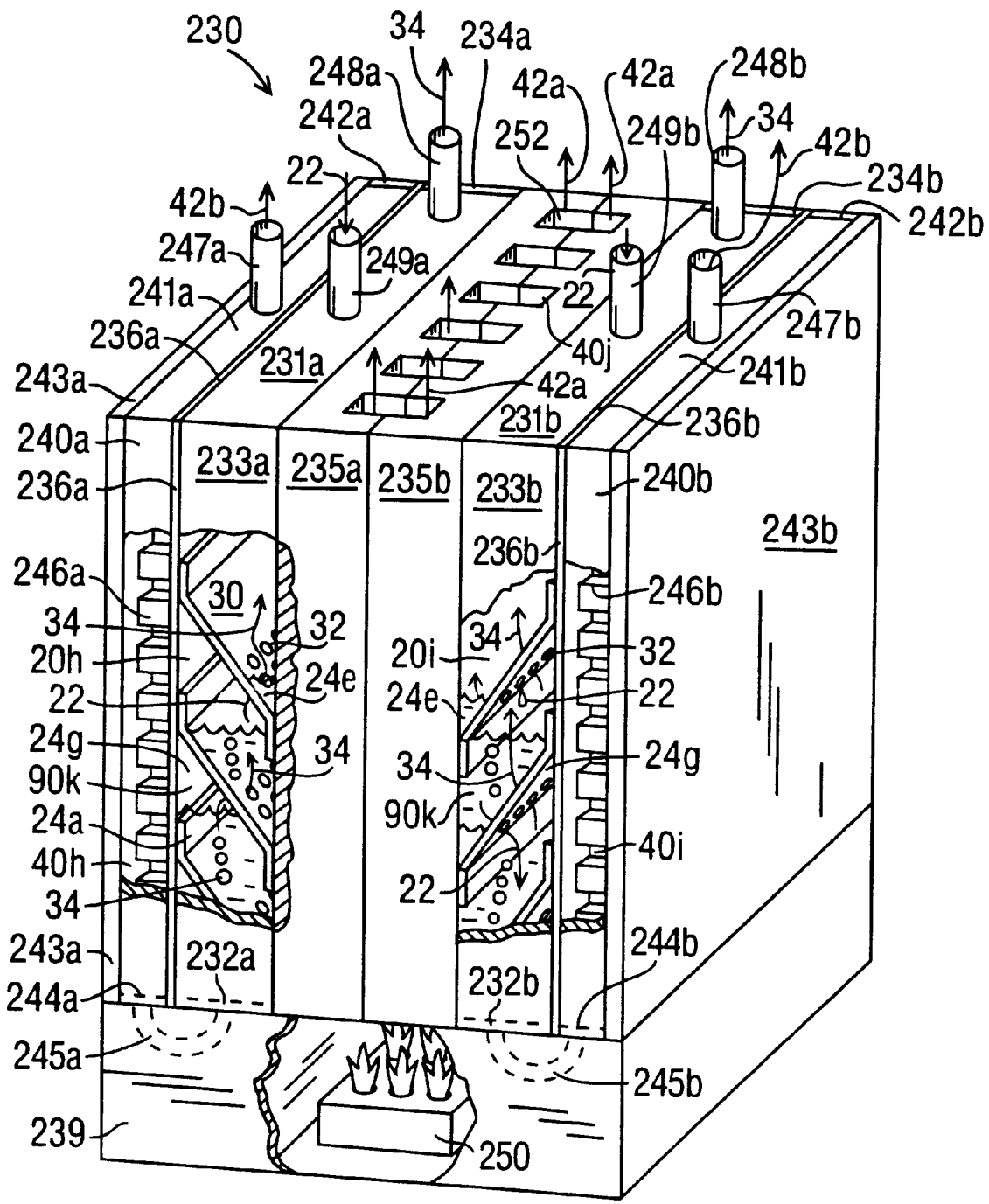
FIG. 14 is a partially cut away perspective view of a hexahedral embodiment of the present invention using angled fluid distribution surfaces to divert liquid toward the hotter, combustion product heated side of the first fluid space.
Figure 15:
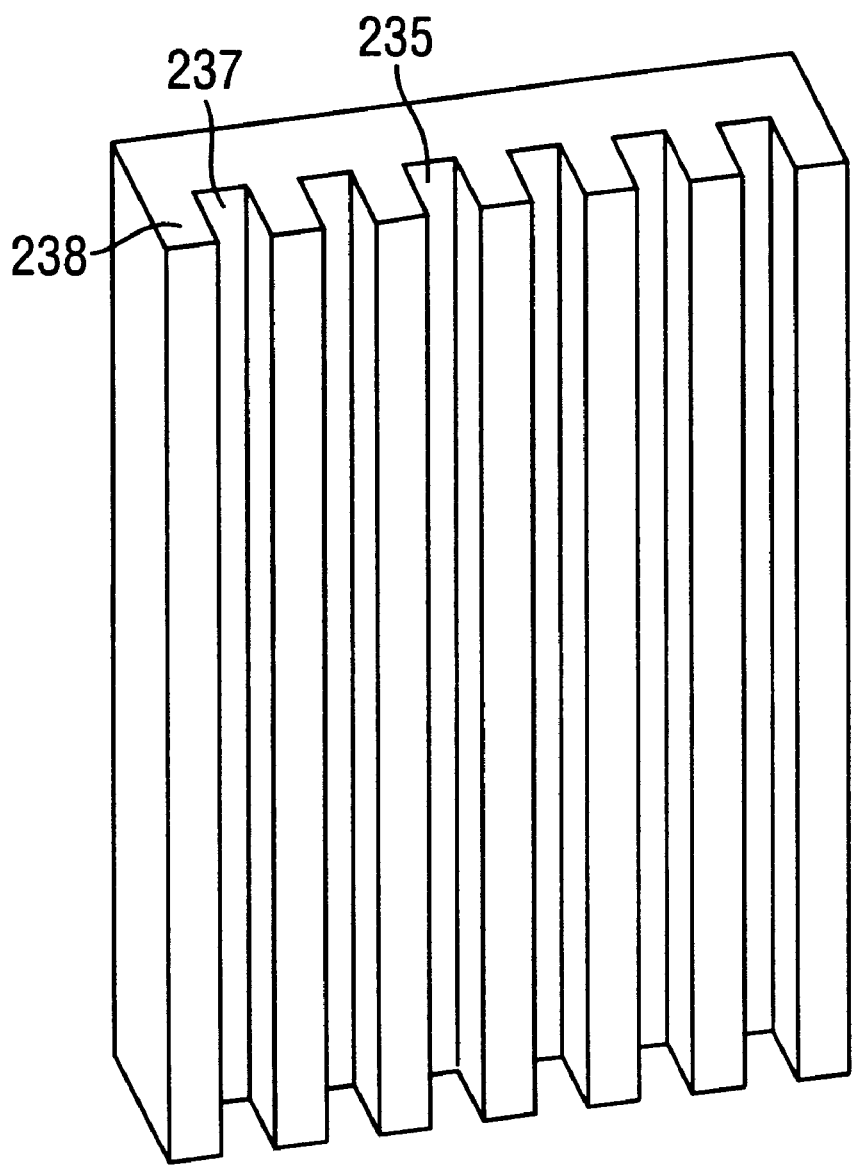
FIG. 15 is a perspective view of a heat exchange surface used for combustion product heating.
Figure 16:
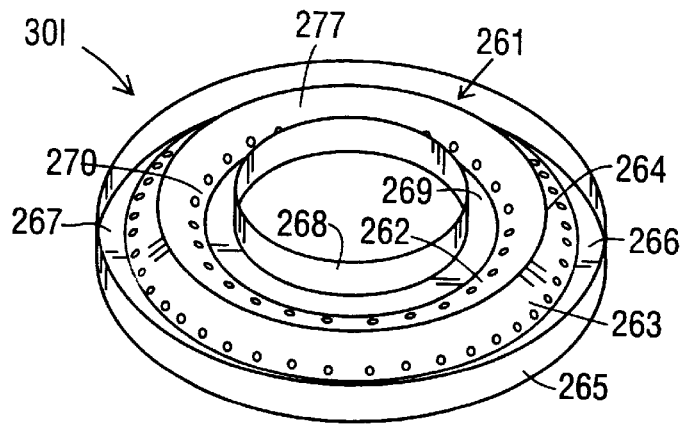
FIG. 16 is a perspective view of an annular fluid distribution surface according to the present invention with fluid distribution apertures in angled surfaces.
Figure 17:
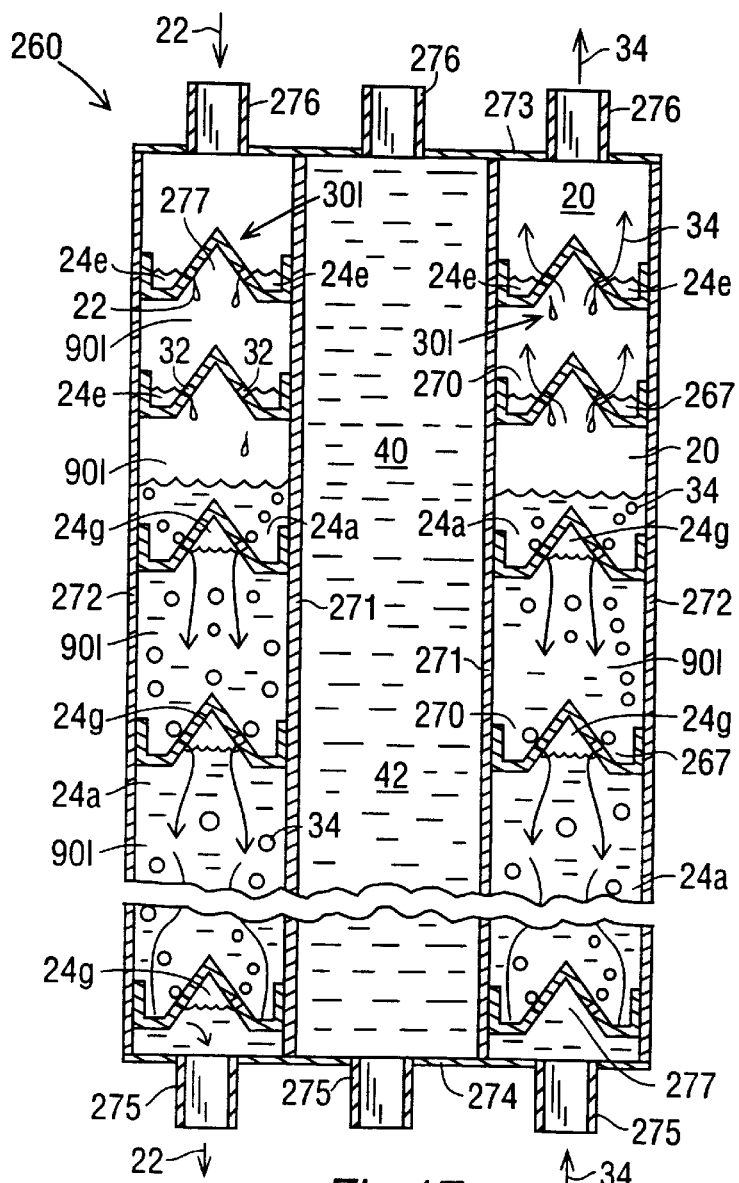
FIG. 17 is a partial cross-sectional view of an annular heat exchange device according to the present invention using the annular fluid distribution surface of FIG. 16.
Figure 25:
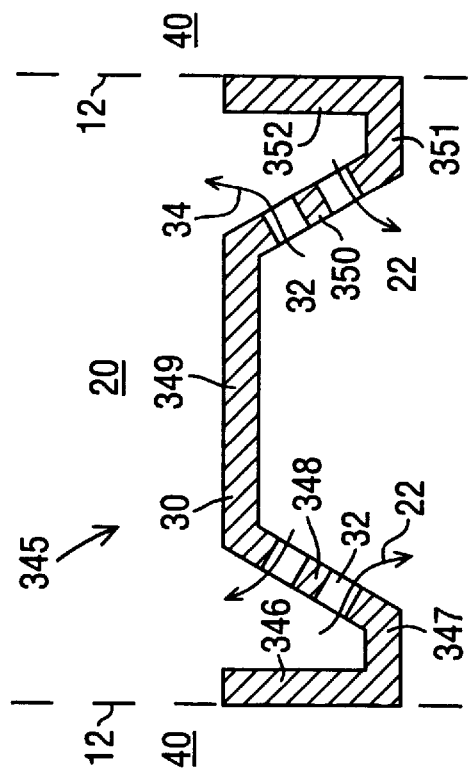
FIG. 25 is a cross sectional view of a fluid distribution surface using two angled aperture surfaces extending upward and toward each other with the upper edges joined by a horizontal surface and the lower edges joined to two vertical surfaces with two horizontal surface to form two troughs.
Figure 26:
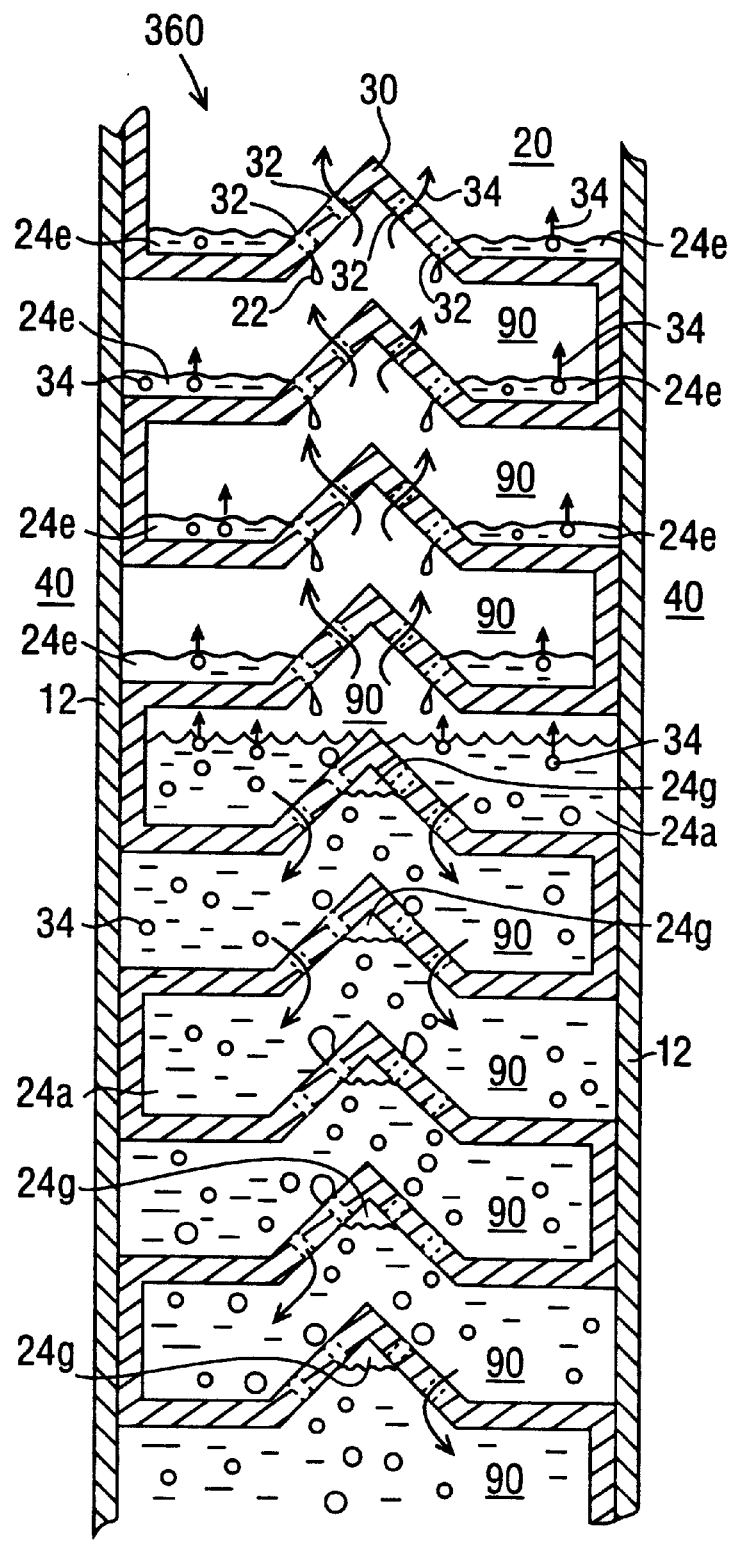
FIG. 26 is a partial end view of an embodiment of the current invention using fluid distribution surfaces with apertures in two angled surfaces angled toward each other and meeting at an apex at each level and formed from a single piece of sheet metal.
Figure 27:
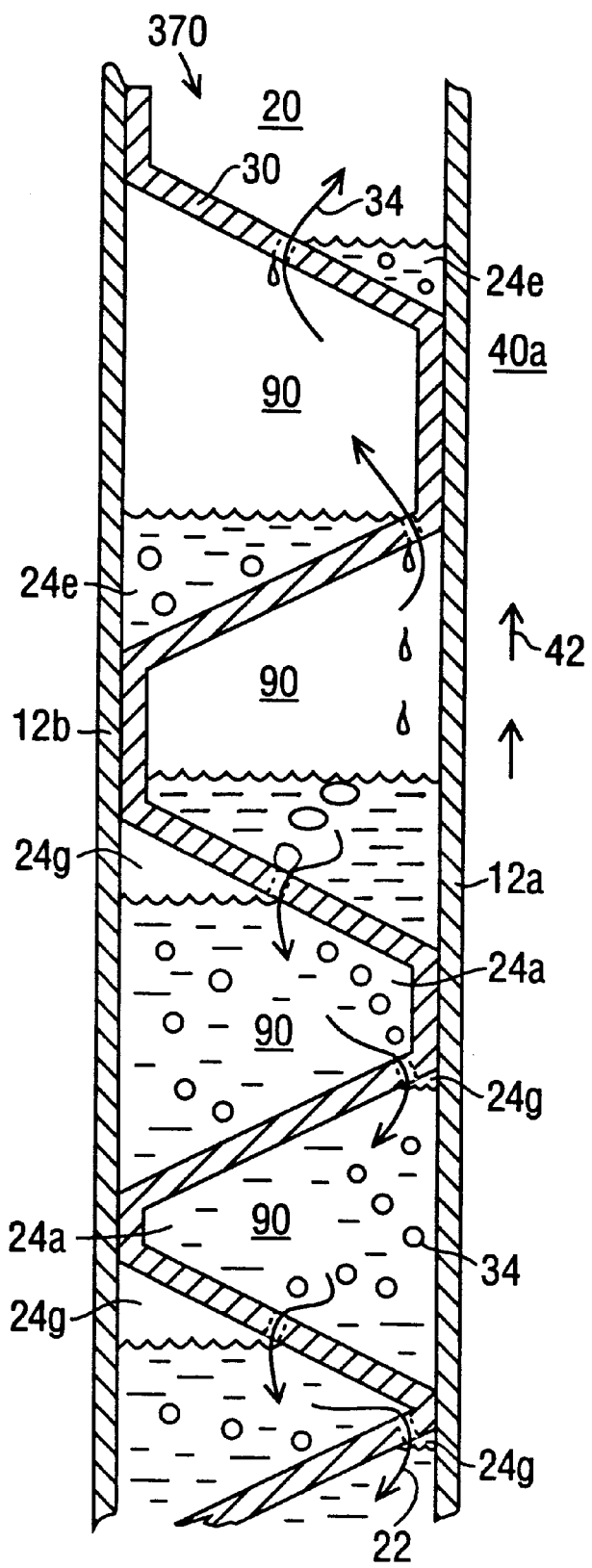
FIG. 27 is a partial end view of an embodiment of the current invention using fluid distribution surfaces with apertures in successively oppositely angled surfaces and formed from a single piece of sheet metal.
Figure 28:
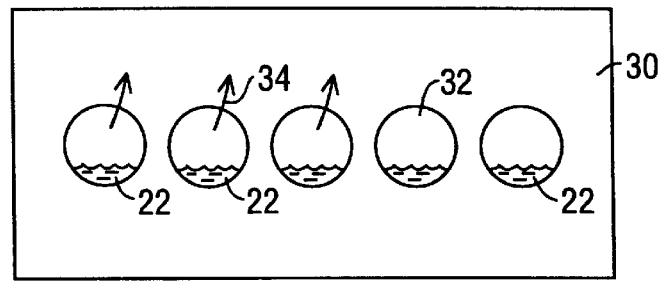
FIG. 28 is a front view of a fluid distribution surface of the present invention using large circular apertures for both liquid and gas management.
Figure 29:
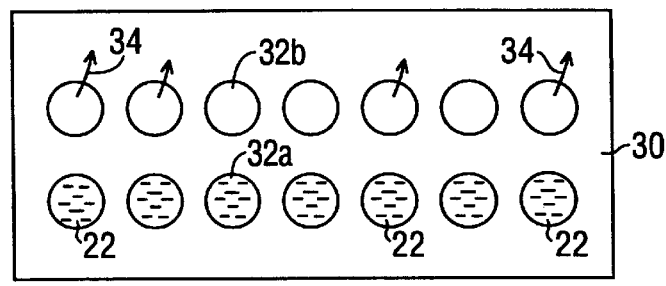
FIG. 29 is a front view of a view fluid distribution surface of the present invention using two rows of circular apertures with one row directly above the other and with the upper row used for gas flow and the lower row of apertures used for liquid flow.

FIGS. 14–27 illustrate various embodiments of distribution plate 30 in which apertures 32 are placed in an angled fluid distribution surface 30. FIGS. 14–15 illustrated an embodiment of the heat exchange device of the current invention in which the device is used as a gas-fired desorber. FIGS. 16–20 show various overall geometrical configurations of the heat exchange device with FIGS. 16–17 showing a annular distribution configuration, FIGS. 18–19 a cylindrical configuration, and FIG. 20, a hexahedral configuration. FIGS. 21–25 show various configurations of the angled fluid distribution surface 30. FIGS. 26 and 27 show distribution surfaces 30 constructed from a single piece of sheet metal.

Referring now to FIGS. 14–15, a heat exchange device 230 operating as a generator (desorber) is mounted on base 239 and consists of a first fluid space 20h, 20i. First fluid space 20h is defined by an enclosure comprising top 231a, bottom 232a, front 233a, back 234a, and sides 235a and 236a. Similarly first fluid space 20i is defined by an enclosure comprising top 231b, bottom 232b, front 233b, back 234b, and sides 235b and 236b. Conduits 248a and 248b provide upper openings for upward flowing gas 34 from first fluid space 20h and 20i, respectively. Conduits 249a and 249b provide upper openings for downward flowing liquid (strong solution) 22.

A closed second fluid space 40h is defined by front 240a, top 241a, back 242a, bottom 244a, and sides 236a and 243a. Second fluid space 40i is defined by front 240b, top 241b, back 242b, bottom 244b, and sides 236b and 243b. Conduits 247a and 247b provide openings at the top of second fluid space 40h and 40i for the outflow of fluid 42b. Conduits 245a and 245b at the bottom of first and second fluid spaces 20h, 20i and 40h, 40i, respectively, provide a flow path for downward flowing fluid 22 to leave first fluid space 20h and 20i (now a weak solution) and enter second fluid space 40h and 40i. The weak solution is designated as 42b as it flows upward in second fluid space 40h and 40i.

Second fluid space 40*j* is a generally open space formed by plates 235 having ribs 238 on one side that define grooves 237. Ribbed plates 235*a*, 235*b* are aligned so that ribs 238 contact each other and form vertical slots 252 through which combustion products 42*a* from gas burner 250 pass to provide a source of heat to device 230.

As shown, the second fluid space 40 comprises second fluid spaces 40*h*, 40*i*, and 40*j*. Fluid space portion 40*h* is separated from first fluid space portion 20*h* by vertical surface 236*a* while second fluid space portion 40*i* is separated from first fluid space portion 20*i* by vertical surface 236*b*. Third fluid space portion 40*j* is separated from first fluid space 20*h* by vertical surface 235*a* and from first fluid space 20*i* by vertical surface 235*b*.

First fluid space 20*h* and 20*i* are divided into cells 90*k* by means of angled fluid distribution surfaces 30*k* with rows of apertures 32. First fluid spaces 20*h* and 20*i* further comprise a liquid filled volume 24*a*, liquid accumulation pools 24*e*, and vapor pockets 24*g*.

In operation, a strong solution 22 enters first fluid space 20*h* and 20*i* through inlet conduits 249*a* and 249*b* and accumulates in liquid pools 24*e* along vertical plates 235*a* and 235*b*. The hot combustion gases 42*a* flowing through second fluid space 40*j* transfer heat to vertical plates 235*a*, 235*b* and the fluid distribution plates 30 which in turn heat the strong liquid 22 in liquid pools 24*e* causing desorption of vapor 34. As liquid 22 accumulates in liquid pool 24*e* it rises to the lower row of apertures 32, flows through apertures 32 and drips onto and wets the next lower distribution plate 30 and vertical plates 235*a*, 235*b* in next lower cells 90*k* continuing to receive heat from combustion gases 42*a* via vertical plates 235*a*, 235*b* and distribution surfaces 30. Liquid 22 continues its downward path reaching the lower filled liquid volume state 24*a* where more intense combustion gas heating continues to drive absorbed gas from liquid 22. Desorbed gas bubbles 34 accumulate in vapor pockets 24*g* until sufficient vapor 34 is available to pass through upper of apertures 32 in angled distribution surface 30.

Since the distribution plates are angled toward vertical surface 235*a*, 235*b*, the stream of vapor 34 is directed to those surfaces and stirs and promotes heat transfer to the liquid 22 from heated surfaces 235*a*, 235*b*. The use of the vertical surface to divide first fluid space 20*h*, 20*i* into cells 90*k* provides good agitation of the liquid and vapor in each cell to promote effective mass and heat transfer while maintaining an effective concentration gradient of liquid 22. That is, the fluid distribution surfaces prevent mixing of the fluid 22 throughout the first fluid space 20*h*, 20*i* thereby affording a fully desorbed liquid 22 at the bottom of the first fluid space 20*h*, 20*i* while allowing robust agitation and resulting enhanced heat and mass transfer within each cell 90*k*.

On leaving the liquid filled volume state 24*a*, vapor 34 continues to rise in upper first fluid space cells 90*k*. It passes though upper rows of apertures 32 and through each cell 90*k* until it leaves the first fluid space 20*h*, 20*i* via openings provided by conduits 248*a*, 248*b*.

Fluid 22, essentially devoid of absorbed vapor 34, leaves first fluid space 20*h*, 20*i* through conduits 245*a*, 245*b* in a heated state and enters second fluid space 40*h*, 40*i* where it passes upward through an enhanced heat transfer surface such as offset strip fin 246*a*, 246*b* for heat transfer to first fluid space 20*h*, 20*i* to augment the heating and resulting desorption provided by combustion gases 42*a*, after which its leaves a fluid 42*b*.

FIGS. 16–17 illustrate an annular embodiment 260 of an angled fluid distribution surface 30. As shown in FIG. 16, the fluid distribution surface 30*l* comprises a toroidal triangular portion 261 having annular angular sides 262 and 263 meeting at vertex 264 and forming inverted trough 277. Outer vertical cylindrical surface 265 and annular angular side 263 are joined at the bottom by horizontal annular surface 266 to form outer trough 267. Similarly vertical inner cylindrical surface 268 and annular angular side 262 are joined at the bottom by annular horizontal surface 269 to form inner trough 270. One or more rows of apertures 32 are formed in annular angular surfaces 262 and 263.

Referring to FIG. 17, a first fluid space 20 is defined by inner cylinder 271, outer cylinder 272, top 273 and bottom 274 with vertical inner cylinder 271 separating first fluid space 20 from second fluid space 40 which is defined by inner cylinder 271, top 273 and bottom 274. Although not shown, it is to be realized that a closed outer fluid space 40 may also be created around the circumference of outer cylinder 142 (see FIG. 19). A plurality of annular fluid distribution surfaces 30*l* are placed in spaced-apart arrangement within first fluid space 20 to form annular cells 90*l*.

Typically fluid distribution surface 30*l* is stamped from carbon steel sheet metal with cylindrical vertical surfaces 268 and 265 joined to inner and outer cylinders 271 and 272 using suitable brazing techniques. However, it is to be realized that cylindrical surfaces 268 and 265 may be shortened or eliminated with one or both of inner and outer cylinders 271 and 272 serving as one of both of the vertical walls of troughs 270 and 267. When cylindrical surfaces 268 and 265 are eliminated, the edges of horizontal annular surfaces 269 and 265 are attached directly to outer and inner cylinders 271 and 266, respectively. Similarly horizontal annular surface 269 may also be removed and the bottom edge of one or both of angled surfaces 262 and 263 attached directly to vertical cylindrical surfaces 271 and 272 or to vertical cylindrical surfaces 265 and 268. The use and attachment of cylindrical surfaces 265 and 268 to outer and inner cylinders 272 and 271, respectively, is generally preferred in order to increase heat transfer efficiency with fluid 42 in second fluid space 40 and for ease of device fabrication.

Liquid 22 flows downward through one or more openings formed by conduits 276 into first fluid space 20 accumulating in liquid accumulation pools 24*e* in troughs 267 and 270 until liquid 22 reaches apertures 32 through which it spills into the next first fluid cell 90*l* to again accumulate in troughs 267 and 270 of the next lower liquid distribution surface 30*l*. On reaching the liquid filled volume region 24*a*, liquid 22 continues to flow downward in a serpentine path through apertures 32 of each successive lower distribution plate 30*l* until it leaves via one or more openings formed by conduits 275. In certain instances such as when device 260 is operating as an evaporator, a lower opening such as that form by conduit 275 may not be necessary. On the other hand, when the device is operating in an absorber mode, it may be desirable to use one of the openings in conduits 275 to admit vapor 34 for absorption and the other opening in the other conduit 275 for outflowing strong solution 22.

As vapor bubbles 34 rises in liquid 22 of liquid filled volume 24*a*, it accumulates under apex 264 (inverted triangular toroidal trough 277) to form vapor pocket 24*g* until sufficient vapor has accumulated after which vapor 34 begins to bubble through apertures 32 and then again move upward in downward flowing liquid 22 into the next higher first fluid space cell 90*l*. The angle of the distribution surfaces 262,263 and the position of the apertures 32 in these surfaces is especially effective in directing vapor bubbles 34 against the vertical surfaces (cylinders 271 and 272) to promote effective heat exchange with these surfaces and fluid 42 in second fluid space 42. Apertures 32 also serve to break vapor 34 into small discrete bubbles thereby promoting effective mass transfer from the vapor to the liquid state. Vapor 34 continues upward in first fluid space cell 90*l* reaching the next upper distribution plate 30*e* where another vapor pocket 24*g* forms and after sufficient vapor 34 has accumulated, it bubbles through apertures 32 into the next cell 90*l* where the process is repeated. On reaching the surface of the liquid filled volume 24*a*, the vapor 34 continues to move upward through apertures 32 to successively higher fluid distribution surfaces 30*l* in a serpentine path leaving through an opening formed by conduit 276 in top plate 273. In certain applications such as when the device is operating as a condenser, it may not be necessary to have openings in the top of fluid space 20. To maintain relatively constant vapor velocity in the device under conditions in which the gas volume is reduced as it moves upward (e.g., condensing or absorbed gases or vapors), the vertical spacing between successive distribution plates 32*l* is incrementally reduced in going from the bottom to the top of device 260.

Figure 18:
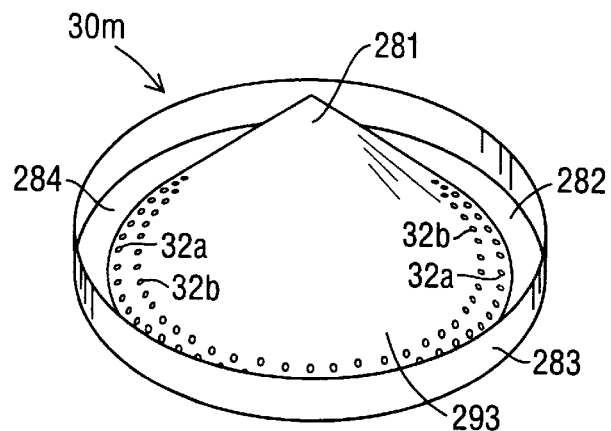
FIG. 18 is a perspective view of a conical fluid distribution surface according to the present invention with fluid distribution apertures in the conical surface.
Figure 19:
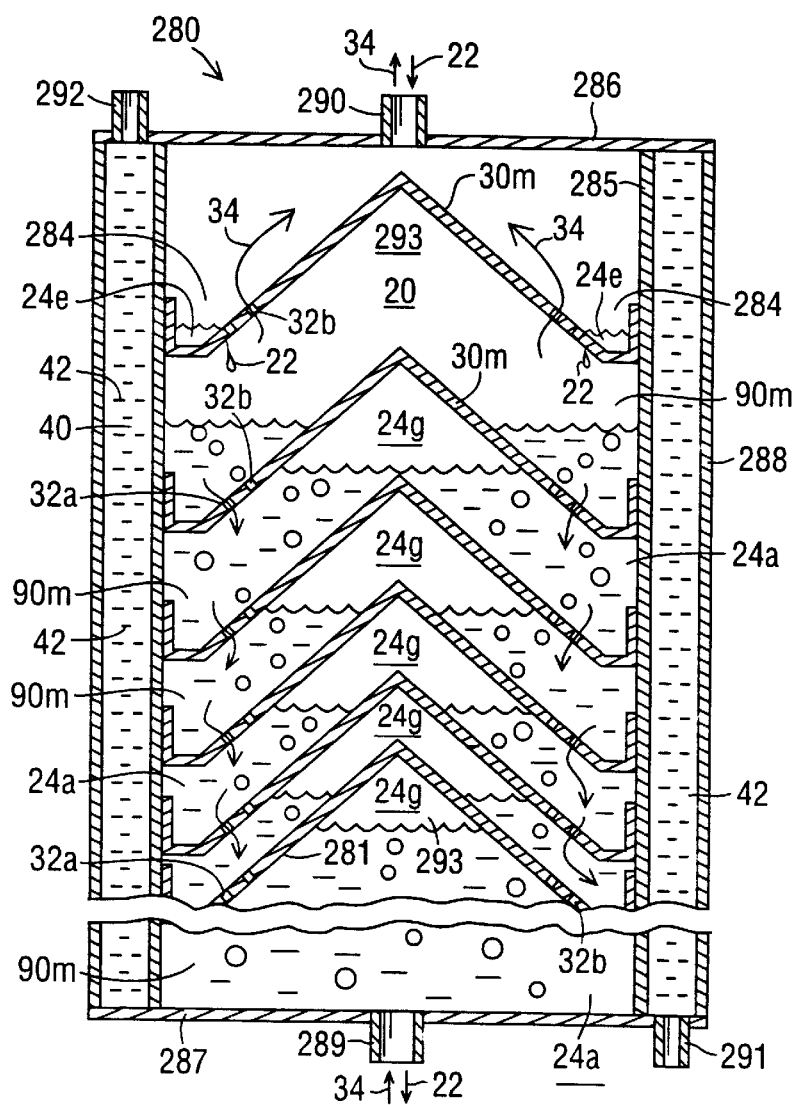
FIG. 19 is a partial cross-sectional view of a cylindrical heat exchange device according to the present invention using the conical fluid distribution surface of FIG. 18.

FIGS. 18–19 illustrate a conical embodiment 280 of fluid distribution surface 30. As shown in FIG. 18, the fluid distribution surface 30*m* comprises a conical surface 281 joined at its bottom edge by horizontal annular surface 282 to vertical cylindrical surface 283 to form trough 284. A double row of apertures 32 with the upper row of apertures 32*b* staggered with respect to the lower row of apertures is formed in conical (angled) surface 281.

In FIG. 19, a cylindrical first fluid space 20 is defined by cylinder 285, top 286, and bottom 287 with vertical cylinder 285 separating first fluid space 20 from annular second fluid space 40 defined by inner cylinder 285, outer cylinder 288, top 286 and bottom 287. A plurality of annular fluid distribution surfaces 30*m* are placed in spaced-apart arrangement within first fluid space 20 to form cylindrical cells 90*m*.

Cylindrical surface 283 may be joined to cylinder 285 using a suitable joining technique such as a brazing technique. Cylindrical surface 283 may be shorted or eliminated with cylinder 285 serving as one of the walls of trough 284. Similarly horizontal annular surface 284 may be eliminated with conical surface 281 jointed directly to cylinder 285.

Generally, and as noted above with more detail, a liquid 22, after entering first fluid space 40 through an opening in conduit 290, if necessary, flows downward collecting in liquid accumulation pools 24*e* in trough 284 where on rising to a sufficient level spills out through the lower row of apertures 32*a* into the next lower first fluid cell 90*m*, then onto next lower fluid distribution surface 30*m* repeating the accumulation process in troughs 284 until joining liquid 22 in liquid filled volume 24*a* where liquid 22 continues to flow downward through each lower cell 90*m* of liquid filled volume 24*a* via apertures 32*a*. Depending on the process, liquid 22 may be withdrawn through a lower opening provided by a conduit such as conduit 289.

Simultaneously vapor 34 enters first fluid space 20 via a lower -opening provided by a conduit such as conduit 289, if necessary, it being realized that in certain processes such as desorption and evaporation, the gas(vapor) is a part of and is released from the downward flowing liquid 22. Vapor passes upward in bottom first fluid cell 90*m* and collects in vapor pocket 24*g* beneath conical surface 281 (inverted conical trough 293) and after sufficient vapor accumulates, it passes through the upper row of apertures 32*b* in conical surface 281 of fluid distribution plate 30*m* into the next cell 90*m* where the process is repeated. On reaching the surface of liquid filled volume 24*a*, the vapor 34 continues to move upward through succeeding cells 90*m* via the apertures 32*b* in fluid distribution surfaces 30*m* until it exists, if necessary, through an opening provided by a conduit such as conduit 290.

To maintain relatively constant vapor velocity should the process provide greater amounts of vapor in each succeeding upper cell 90*m*, the vertical spacing between successive distribution plates 32*m* may be incrementally increased in going from the bottom to the top of device 280. Similarly if the process occurring in first fluid space 20 provides lesser amounts of vapor in each succeeding upper cell (e.g., absorption or condensation), the vertical spacing between succeeding distribution plates 30*m* may be incrementally decreased in going from the bottom to the top of the device (e.g., device 260 of FIG. 17).

A fluid 42 is provided in second fluid space 40 via openings provided by conduits such as conduits 291, 292. An enhanced heat exchange surface such as an offset strip fin, Raschig rings, Berl saddles, Intalox saddles, telleretes, or Pall rings may be provided for more effective heat transfer between the first fluid space 20 and second fluid space 40.

Figure 20:
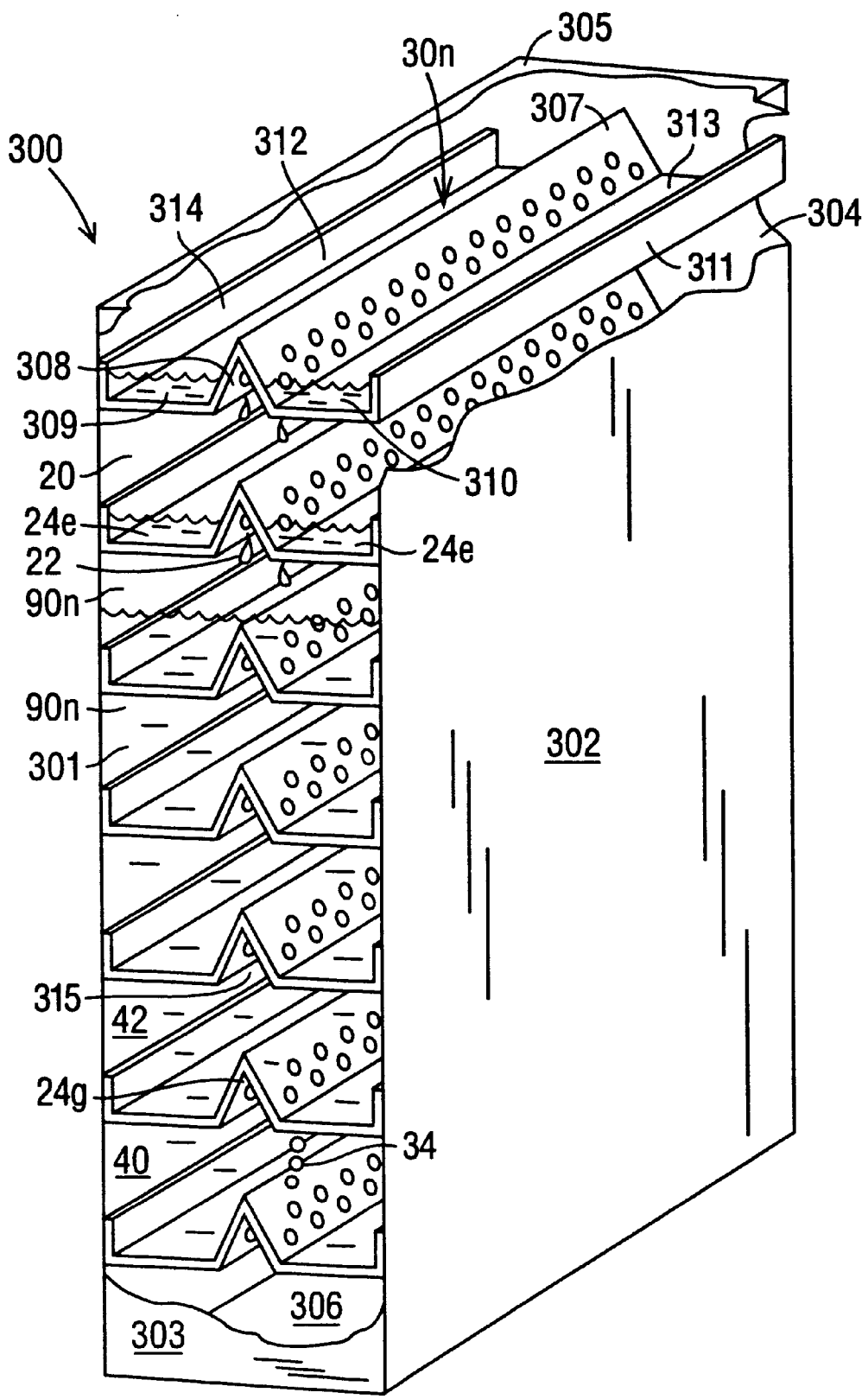
FIG. 20 is a partially cut away perspective view of a hexahedral embodiment of the present invention using rectangular segments to form the fluid distribution surfaces with fluid distribution apertures located in angled surfaces.

FIG. 20 is a partial embodiment of the present invention that illustrates an angled distribution surface 30 in a hexahedral configuration in which the first fluid space 20 is defined by sides 301, 302, front 303, back 304, top 305 and bottom 306. Openings for ingress and egress of fluids to the first fluid space (not shown) are provided according to the requirements of the process carried out within the first fluid space 20.

The fluid distribution surfaces 30*n* are formed by bending or forming a rectangular piece of sheet metal into the requisite shape. Angular rectangular sections 307, 308 are joined to horizontal bottom rectangular pieces 309, 310 to form troughs 313, 314. One or more rows of apertures 32 are formed in angled rectangular sections 307 and 308.

As with previous embodiments, device 300 operates with a downward flowing liquid 22 typically in a liquid filled condition 24*a* and with liquid accumulation pools 24*e* formed in troughs 313, 314 spilling liquid 22 into the next lower first fluid cell 90*n* through apertures 32. Gas (vapor) 34 in the form of bubbles rises within the lower liquid filled volume 24*a* to accumulate in vapor pockets 24*g* formed in inverted triangular trough 315 and on sufficient accumulation are broken by apertures 32 into small bubbles that again rise in the next fluid space cell 90*n*. On reaching the surface of the liquid filled volume 24*a*, vapor 34 continues to move upward in a serpentine fashion passing though the apertures of each higher distribution plate 30*n*. One or more heat transfer fluids 42 in second fluid space (either open or closed) exchanges heat with first fluid space 20 via vertical surfaces such as surfaces 301, 302.

Figure 21:
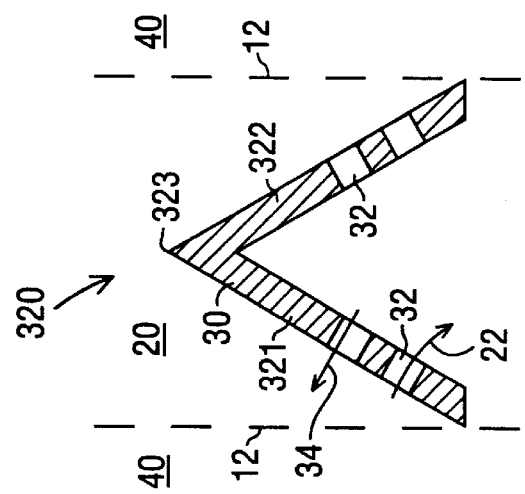
FIG. 21 is a cross sectional view of a fluid distribution surface using two angled aperture surfaces.

FIGS. 21–25 show additional embodiments of angled distribution surface 30. As previously noted, reference numeral 20 refers to the first fluid space, 40 refers to the second fluid space, 12 refers to the vertical surface separating the two fluid spaces 20 and 40, and 32 refers to apertures in the distribution surface 30. In FIG. 21, distribution surface 320 uses two surfaces 321 and 322 that are angled away from vertical surface 12 so that apertures 32 direct gas 34 toward and upward against surface 12. The elimination of horizontal trough surfaces encourages thorough gas liquid mixing and agitation at the vertical surface boundary layer.

Figure 23:
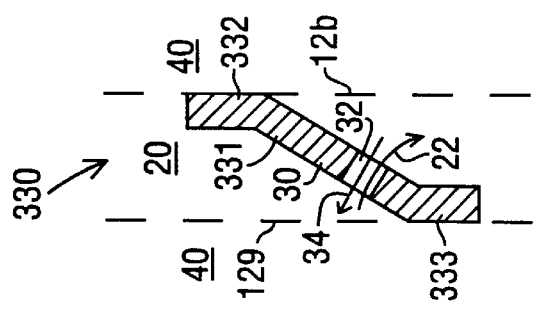
FIG. 23 is a cross sectional view of a fluid distribution surface using a single angled aperture surface and two vertical surfaces, one extending downward from the lower edge of the angled surface and the other extending upward from the upper edge of the angled surface.
Figure 22:
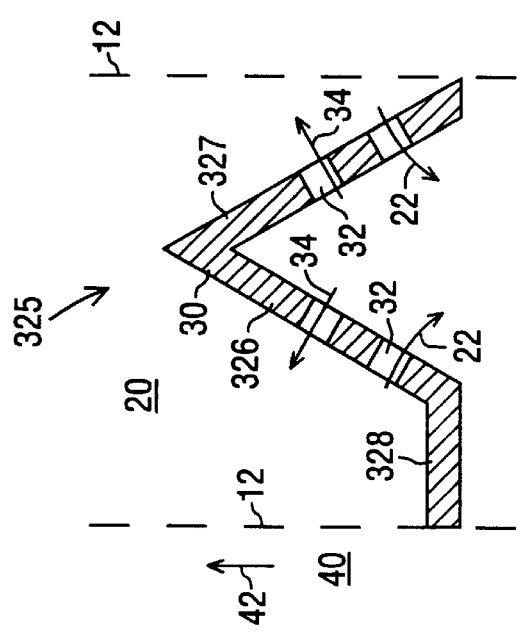
FIG. 22 is a cross sectional view of a fluid distribution surface using two angled aperture surfaces and a horizontal surface attached to the bottom of one of the angled surfaces.
Figure 24:
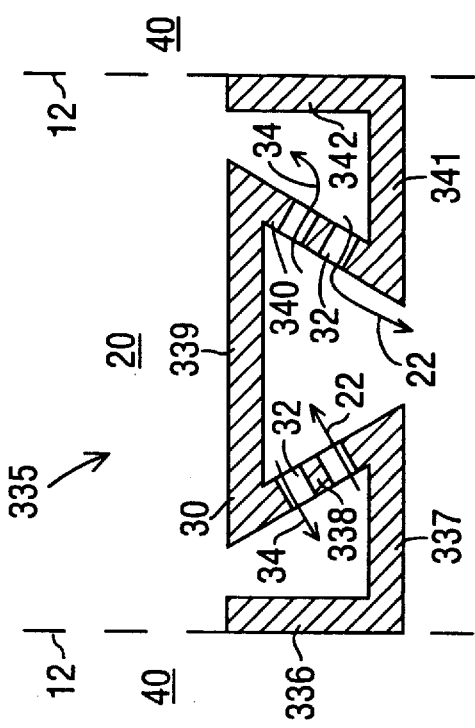
FIG. 24 is a cross sectional view of a fluid distribution surface using two angled aperture surfaces extending upward and away from each other with the upper edges joined by a horizontal surface and the lower edges joined to two vertical surfaces with two horizontal surface to form two troughs.

In FIG. 22, surfaces 326 and 327 again direct vapor 34 upward and toward vertical surfaces 12. The use of horizontal surface 328 provides for a large liquid accumulation trough on one side of the distribution surface such as might be need to prevent burnout when the fluid in second fluid space 40 (on the left side of the figure) is hot combustion gas 42. FIG. 23 illustrates a fluid distribution surface 330 in which only a single angled surface 331 is used for distribution surface 30. Such a surface is particularly effective when it is desirable to effect mixing, agitation and/or heat transfer on a particular vertical surface such as surface 12a. FIGS. 24 and 25 illustrate angled distribution surfaces 30 in which the angled surfaces 30 are joined at both the top and bottom edges by horizontal surfaces. In FIG. 24, angled sides 338 and 340 slant upward toward opposite vertical surfaces 12 and are connected at their lower ends to vertical sides 336 and 342 by horizontal lower surfaces 337 and 341 and at their upper ends to horizontal upper surface 339. As a result of slanting surfaces 338 and 340 upward toward vertical surface 12, vapor 34 is directed briefly downward against vertical surface 336 and liquid 22 is directed upward as they emerge from apertures 32 in angled sides 338, 340. Apertures in such an arrangement direct vapor upward toward vertical surfaces 12 and liquid 22 downward toward the center of first fluid space 20. In FIG. 25, angled surfaces 348 and 350 are angled upward toward each other and away from vertical surfaces 12, but rather than form an apex, they are joined by horizontal surface 349. The lower edges of angled surfaces 348 and 350 are joined to vertical surfaces 346 and 352 by horizontal surfaces 347 and 351.

FIGS. 26 and 27 illustrate distribution surfaces 30 formed from a single sheet of material and bent to achieved the desired configuration. This is especially useful and relatively easy to achieve when an overall hexahedral first fluid space 20 is used. As has been explained previously, 24a refers to a liquid filled volume state, 24e is a liquid accumulation pool, 24g is a vapor pocket, 22 is a downward flowing liquid, 34 an upward flowing vapor (gas), 20 the first fluid space which is divided into fluid space cells 90 by distribution surfaces 30, 12 is a vertical wall separating the first fluid space 20 from a second fluid space 40 containing fluid 42, and 32 designates apertures in distribution plate 30. The apertures 32 in such a surface tend to direct vapor toward the center of the configuration and liquid toward the vertical surfaces 12. FIG. 27 illustrates a non-symmetrical arrangement of apertures to direct or accumulate a specific fluid along a specific vertical surface 12. As illustrated, the apertures 32 are arranged so that only small vapor pockets 24g occur in the liquid filled volume 24a along vertical surface 12a. Such an arrangement would minimize possible burnout from hot combustion gases 42 flowing upward from a burner in second fluid space 40a. Angled surfaces are alternately angled toward and away from vertical surface 12.

In general and given a constant vapor velocity, increased spacing between fluid distribution surfaces tends to increase the mixing of vapor and liquid flows. Such mixing promotes mass transfer within the first fluid space 20 and is especially desirable in absorber applications. For desorber applications, where a concentration gradient from strong solution at the top of fluid space 20 to a weak solution at the bottom, a decreased spacing between fluid distribution surfaces is desirable as this maintains a defined concentration gradient. Closer spacing also affords better heat transfer through the vertical surface separating the first fluid space 20 from the second fluid space 40 via the fluid distribution surfaces 30.

Figure 30:
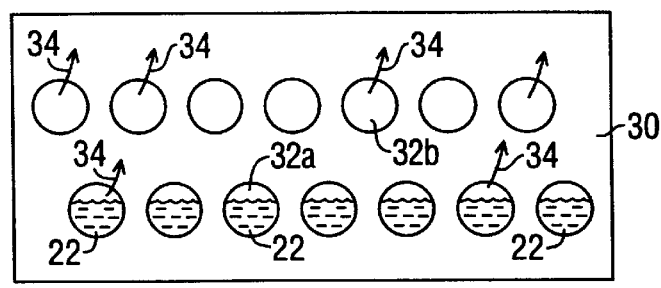
FIG. 30 is a front view of a fluid distribution surface of the present invention using two rows of circular apertures with one row staggered with respect to the other row and with the upper row used for gas flow and the lower row of apertures used for both gas and liquid flow.
Figure 31:
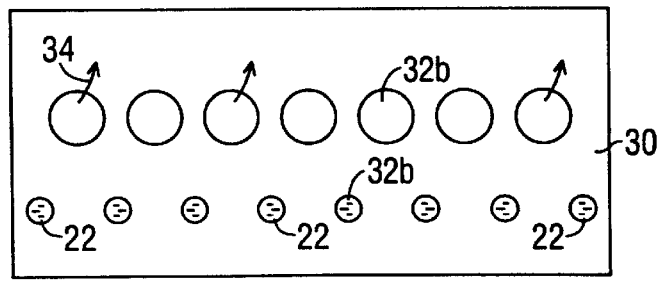
FIG. 31 is a front view of a fluid distribution surface of the present invention using two rows of circular apertures with one row staggered with respect to the other row and with the upper row apertures of larger diameter and used for gas flow and with the lower row of apertures of smaller diameter to permit only liquid flow.

As shown in FIGS. 28–31, a wide variety of aperture arrangements and sizes is contemplated by the present invention including a single aperture in each fluid distribution plate 30 as shown in FIG. 3. Directing both vapor 34 and liquid 22 through the same aperture 32 (FIG. 28) or aligning liquid flow apertures 32a directly below vapor flow apertures 32b (FIG. 29) tends to promote vapor and liquid mixing and is advantageous for absorber and condenser design. Offset rows of vapor flow apertures 32b and liquid flow apertures 32a as shown in FIGS. 30 and 31 tends to maintain separate liquid 22 and vapor 34 flows affording better desorber and evaporator operation. By appropriate selection of offset rows of apertures 32 and flow distribution surface angle, liquid flows in a desorber application can be directed along the vertical surface separating the liquid from the heat source, e.g., combustion products, while directing vapor to the center of fluid space 20 or to vertical surfaces where the temperature differential is less severe as, for example, shown in FIG. 14. Generally when separate liquid and vapor flows are desired, liquid flow apertures 32a should be limited to a size that avoids combined vapor and liquid flow (FIGS. 30 and 31).

Figure 32:
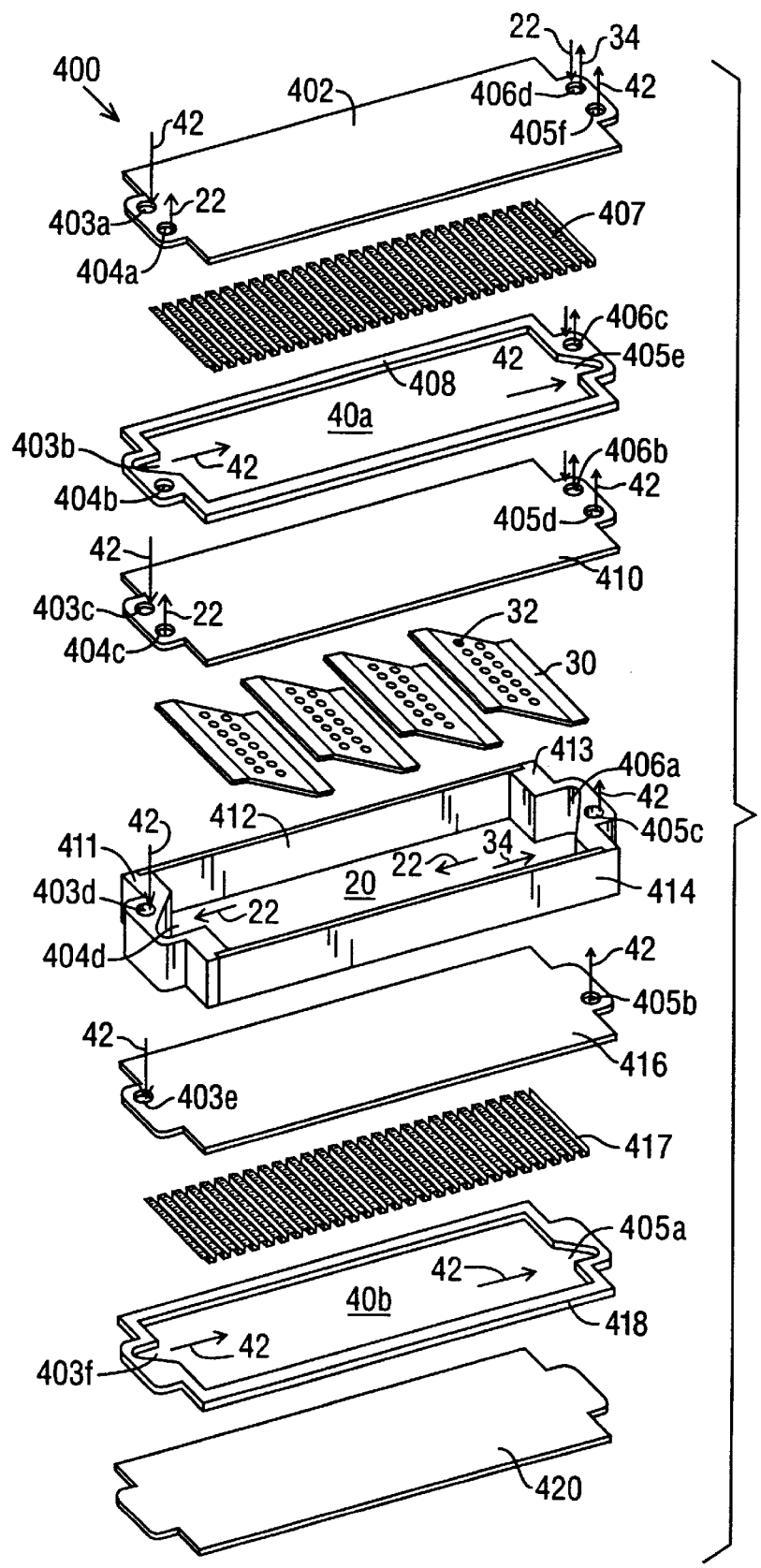
FIG. 32 is a device according to the present invention using sheet metal surfaces and frames to form the second fluid spaces and a portion of the first fluid space.
Figure 33:
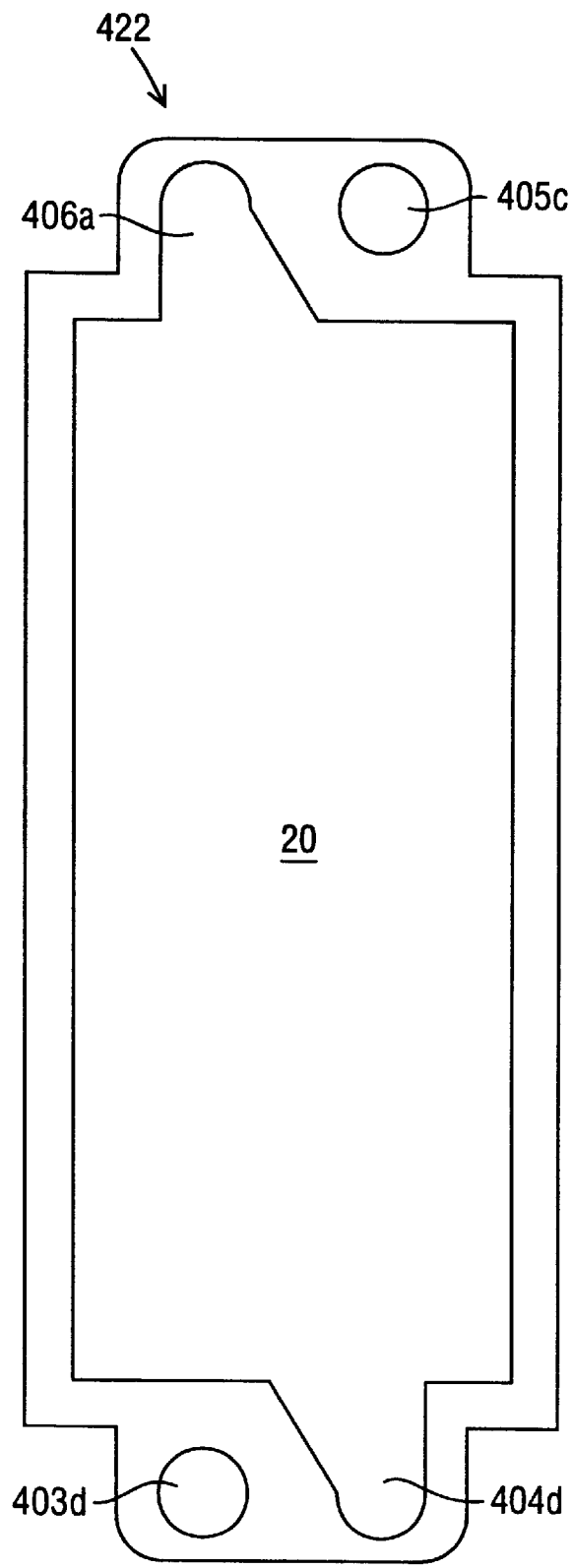
FIG. 33 is a front view of a frame used to define a part of the first fluid space.
Figure 34:
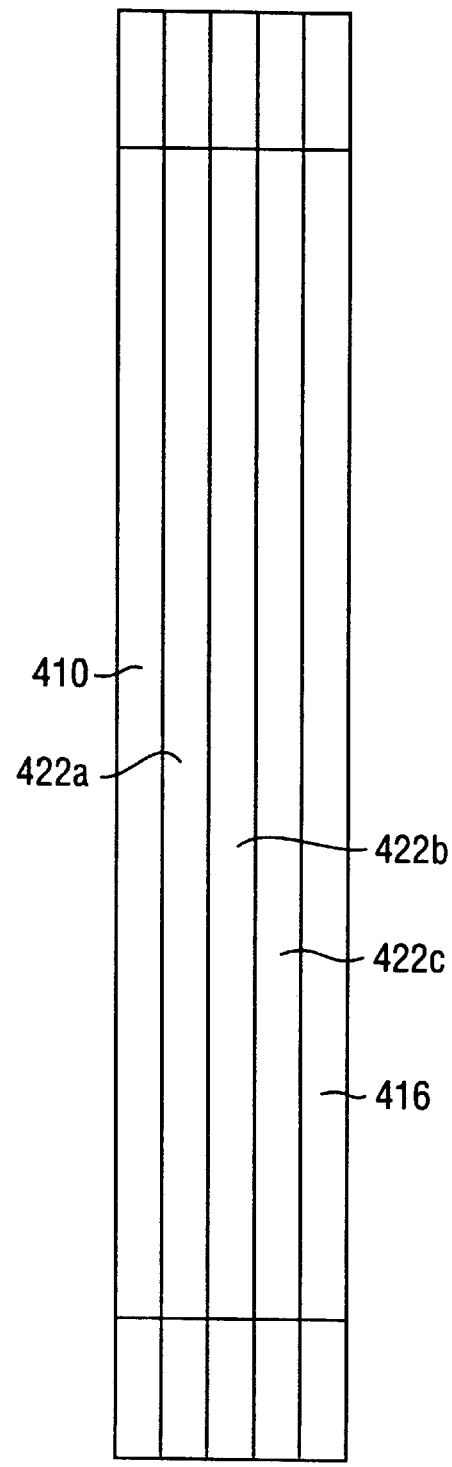
FIG. 34 is an end view illustrating a plurality of frames and vertical end plates forming a first fluid space.

FIG. 32 discloses a heat exchange device 400 featuring sheet metal components having the advantage of low cost materials and fabrication. Vertical surface (sheet metal plates) 410 and 416 separate first fluid space 20 from second fluid space 40a, 40b. First fluid space 20 is defined by an enclose comprising sheet metal plates 410 and 416, lower manifold 411, upper manifold 413, and side plates 412 and 414. Alternatively and as shown in FIGS. 33 and 34, the enclosure 422 for first fluid space 20 may be constructed from layers of punched sheet metal to afford identical frame members 422a–c with vertical plates 410 and 416 completing the enclosure for first fluid space 20.

An enclosure for second fluid space 40a comprises vertical plate 410, punched sheet metal frame 408, and end plate 402. An enhanced heat transfer surface such as offset strip fin 407 is included within second fluid space 40a. Similarly second fluid space 40b comprises an enclosure of vertical plate 416, punched sheet metal frame 418, and end plate 420 and contains an enhanced heat transfer surface, offset strip fin 417.

Operating as a desorber, strong solution enters and flows through apertures 406d (in end plate 402), 406c (in frame 408), 406b (in vertical plate 410), and finally enters the top of first fluid space 20 through inlet opening 406a. Liquid 22 flows downward in first fluid space over angled fluid distribution plates 30 and through apertures 32 formed therein collecting in a liquid filled volume and liquid accumulation pools (not shown; but see, for example, FIG. 14 and the description thereof) and leaving first fluid volume space 20 as a weak solution through liquid 22 outlet opening 404d, then through aperture 404c (in vertical surface 410), through aperture 404b (in second fluid space frame 408), and finally out through aperture 404a in end plate 402. Vapor 34 flows upward in cells in first fluid space 20 formed by fluid distribution surfaces 30, accumulates in vapor pockets beneath fluid distribution surfaces 30, and when sufficient vapor has accumulated flows upward through apertures 32 into the next upper cell eventually leaving through vapor 34 opening 406a and flowing through apertures 406b (in vertical surface 410), 406c (in second fluid space frame 408) and leaving through aperture 406d in end plate 402. As illustrated, the incoming strong solution and outgoing vapor use the same set of openings and apertures (406a–d). However, it is to b understood that such flows may be separated by using an additional set of apertures at the upper end of plates and frames 413, 410, 408, and 402.

Heat for the desorption process is supplied by fluid 42 flowing through second fluid space 40a, 40b. Hot fluid 42 enters lower aperture 403a in plate 402 and then into opening 403b in frame 408 where it splits into two flows. A portion of fluid 42 flows upward through offset stip fin providing heat to liquid 22 in first fluid space via vertical surface 410 and fluid distribution plates 30 and then leaves second fluid space 40a through opening 405e and aperture 405f. The remainder of hot fluid 42 in opening 403b continues on through aperture 403c (in vertical plate 410), through aperture 403d (in manifold 411), through aperture 403e (in vertical surface 416) and then into opening 403f (in second fluid space frame 418) where it flows upward through offset strip fin 417 providing heat to liquid 22 in first fluid space 20 via vertical plate 416 and distribution surfaces 30 after which it leaves second fluid space 40b through opening 405a in second fluid space frame 418, then flows through apertures 405b (in vertical plate 416), 405c (in upper manifold 413), 405d (in vertical plate 410) and then into opening 405e (in second fluid space frame 408) where it joins the split flow from second fluid space 40a and flows out through aperture 405f in end plate 402.

Figure 35:
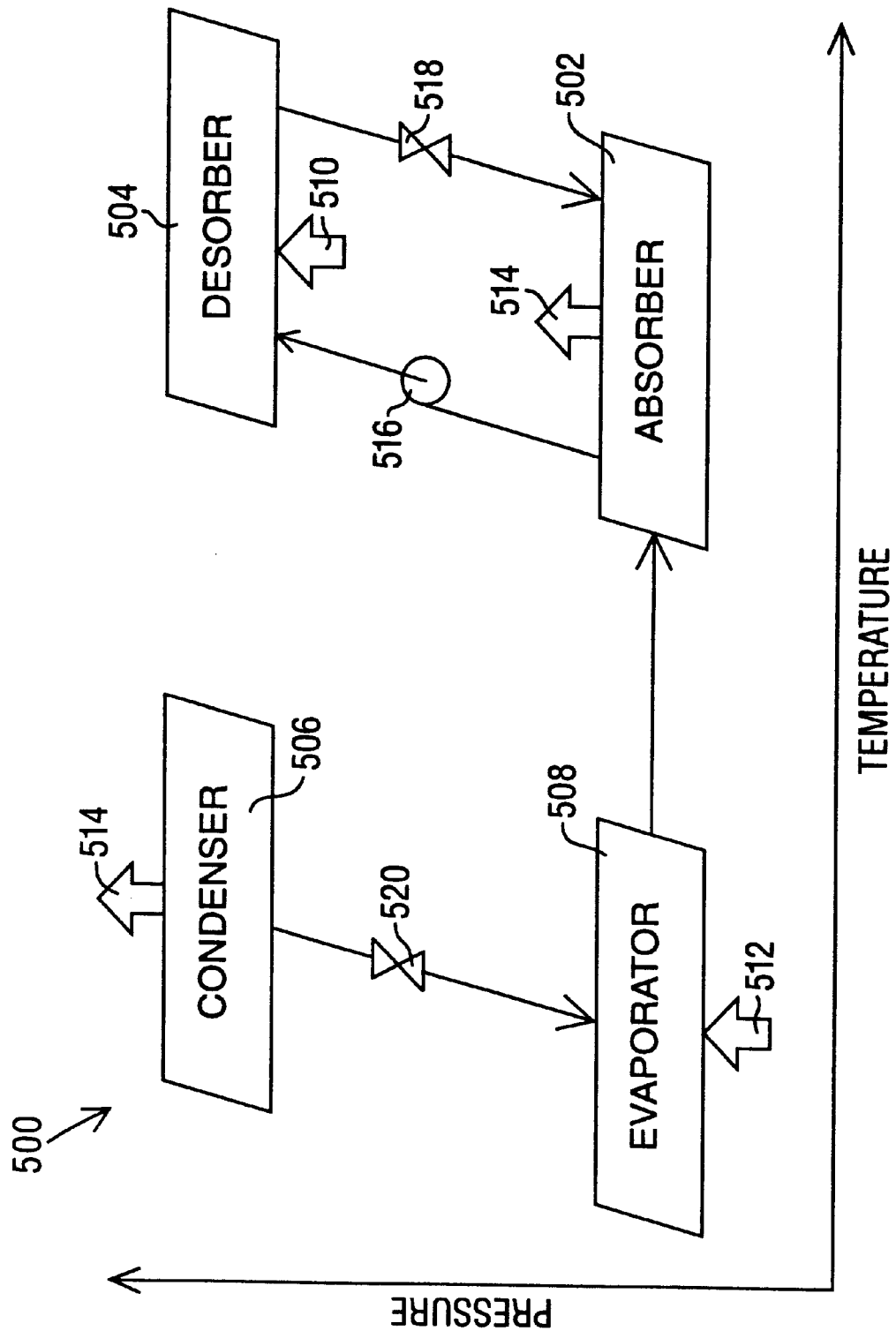
FIG. 35 is a schematic of a simple absorption refrigeration machine in which the embodiments of the current invention are used.

Although useful for a variety of heat exchanger applications, the device of the current application is particularly useful in absorption refrigeration machines where the basic configuration of the present invention can be used as a generator, desorber, condenser, and/or evaporator. Of particular advantage is the use of punched and folded sheet metal configurations that enable the construction of a simple and compact refrigeration machine unit. In its basic form and as shown in FIG. 35, a refrigeration machine 500 comprises an interconnected absorber 502, desorber (generator) 504, condenser 506, and evaporator 508 that use a refrigerant and an absorbent as a refrigerant or solution pair and a heat source 510 to transfer heat between a heat load 512 and a heat sink 514.

The absorber 502 contacts low pressure refrigerant vapor with a miscible absorbent. Absorption takes place as a result of the mixing tendency of the miscible materials as well as an affinity between the refrigerant vapor and the absorbent and results in the generation of thermal energy which is released to the heat sink 514. The mixture formed by the absorption process, which is referred to here as a strong solution, is typically pressurized by means of a solution pump 516 and conveyed to the desorber (generator) 504.

The generator (desorber) 504 causes the refrigerant vapor and absorbent to separate as a result of the application of heat 510. When the absorbent is a nonvolatile material, heating of the strong solution is sufficient to accomplish complete separation of the refrigerant vapor. The remaining absorbent, referred to as a weak solution, is returned to the absorber via expansion valve 518 (to reduce pressure) to again begin the absorption process.

After desorption, the refrigerant vapor passes to condenser 506. The condenser 506 condenses the refrigerant vapor to a liquid with the liberation of heat 514. The hot liquid refrigerant then passes via expansion valve 520 (to lower pressure) to the evaporator 508. The evaporator 508 revaporizes the hot refrigerant liquid at low pressure and temperature with input of heat from the heat load 512, e.g., from the refrigerator, room, building, or other medium the system was designed to cool. From the evaporator 508, the refrigerant vapor enters the absorber 502 to again cycle through the process.

When the absorbent is a volatile material such as water in an ammonia/water refrigerant pair, it is desirable to remove a good portion of the volatile absorbent (water) from the refrigerant vapor (ammonia). Several methods are used to remove the volatile absorbent from the refrigerant vapor. The simplest is a partial condensation process in which the absorbent and refrigerant vapor are partially condensed. The condensate or reflux contains a high amount of absorbent leaving the remaining vapor in a purer state. The process is accomplished by placing a cooled surface in the vapor stream emerging from the desorption process and allowing the reflux to return to the desorption device.

In a more refined process, a counter-flow purification column is used with reflux (condensation) enabled at the top of the column with the strong solution entering the desorber at the bottom of the purification column. Such an arrangement gives a high purity refrigerant vapor and is referred to as a rectifier. On the other hand, if the strong solution for the desorption process is allowed to enter at the top of a purification column in what is termed an analyzer configuration, a high purity liquid absorbent is obtained.

Figure 36:
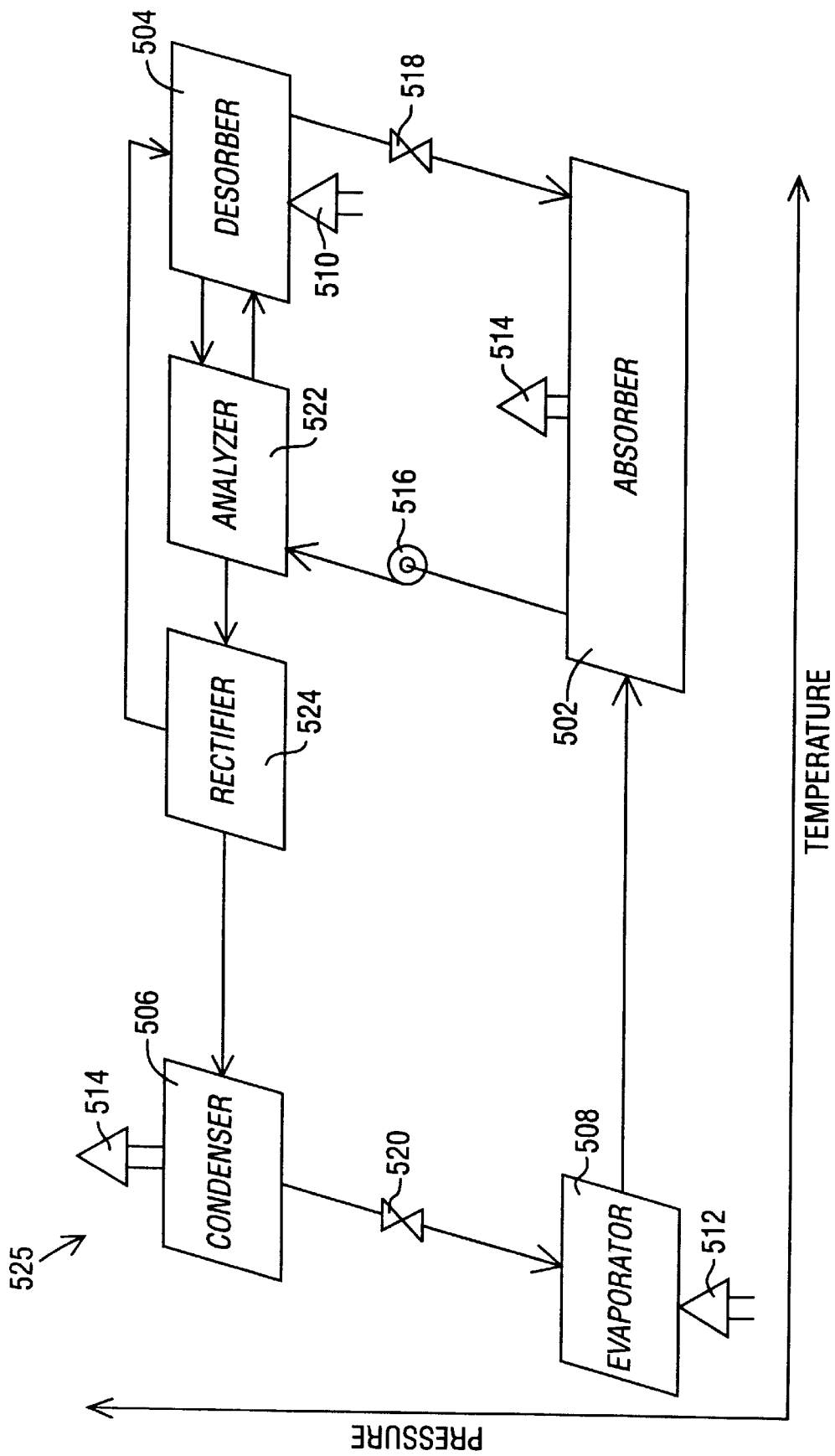
FIG. 36 is a schematic of an absorption refrigeration machine using a rectifier and analyzer to remove volatile absorbent from the refrigerant vapor and in which the embodiments of the current invention are used.

As shown in FIG. 36, strong solution from absorber 514 is pumped to the top of analyzer 522 which returns a pure absorbent to desorber 504. The vapor from the analyzer, laden with absorbent is sent to rectifier 524 were absorbent is removed and returned to desorber 504 while providing pure vapor to condenser 506.

Figure 37:
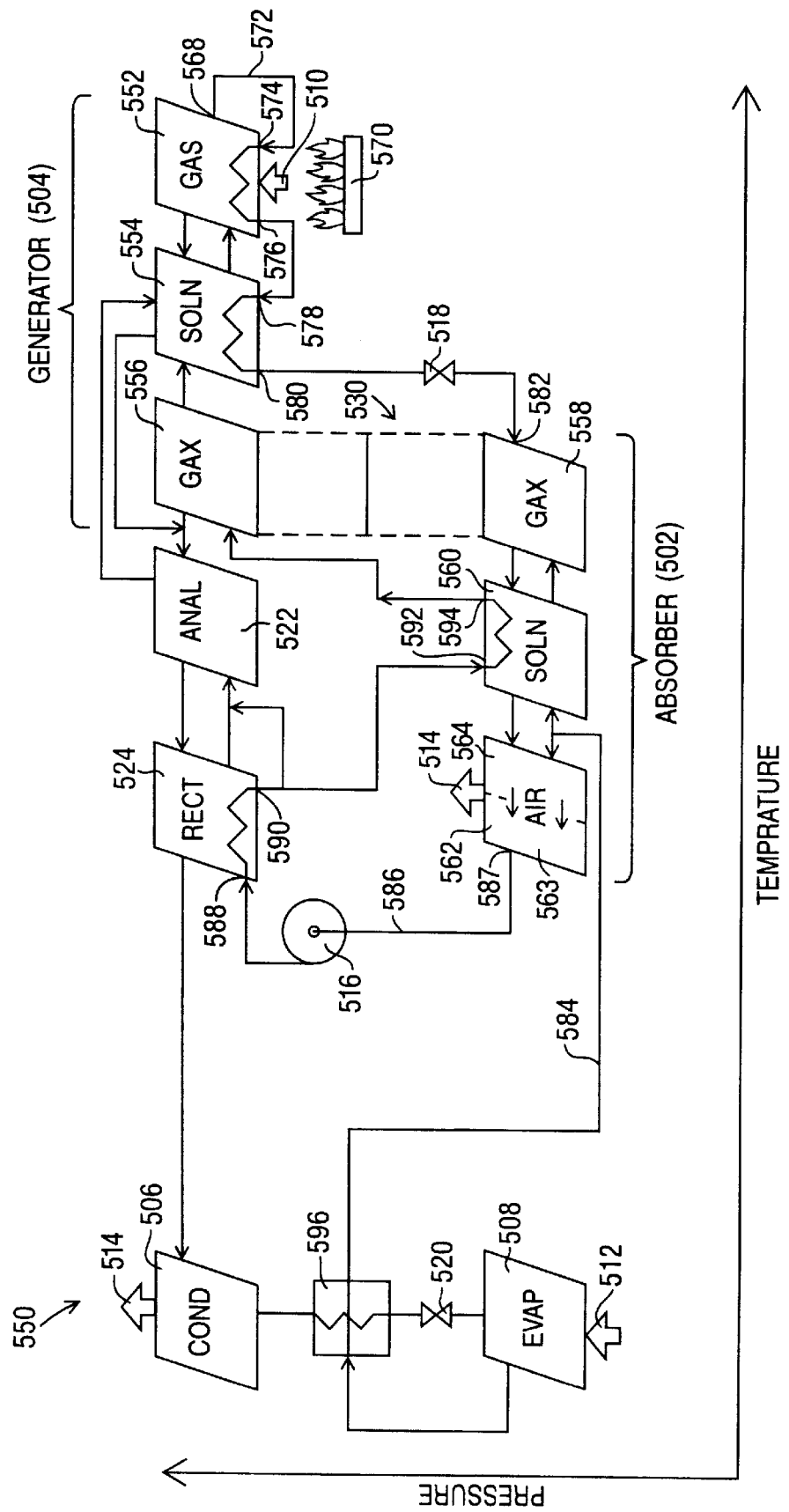
FIG. 37 is a schematic of an generator absorber heat exchange (GAX) refrigeration machine in which the embodiments of the current invention are used.

FIG. 37 illustrates schematically a generator (desorber)-absorber heat-exchange (GAX) machine 550 in which greater operational efficiencies are achieved through additional heat exchange among various components. In this arrangement, it is possible to obtain increased cycle efficiencies by overlapping the temperature ranges of the absorber 502 and desorber 530 to transfer absorber heat from the absorber 502 to the desorber 504. (generator) 504 using a closed heat transfer loop or surface. Sensible heat of hot weak solution is used to heat the generator and heat is transferred between the condensed and evaporated refrigerant.

As shown in FIG. 37, absorber 502, desorber 504, condenser 506, and evaporator 508 are interconnected as previously described for the absorption machines 500 and 525 of FIGS. 35 and 36. Rectifier 524 and analyzer 522 are used to remove absorbent vapor from the desorbed refrigerant stream. Generator (desorber) 504 has been divided into three sections, a gas-heated section 552, a solution heated section 554, and an absorber heated (GAX) section 556. Similarly the absorber 502 has been divided into a desorber (GAX) cooled section 558, a solution cooled section 560, and an air cooled section 562. Optionally the air cooled section 562 may be further subdivided into an air cooled analyzer portion 564 and an air cooled absorber portion 563.

As shown, hot weak solution (devoid of refrigerant vapor) 572 leaves the gas fired section 552 of generator 504 at outlet 568 after being heated by a heat source such as burner 570. The hot solution is returned to the gas-fired generator section 552 via inlet 574 to exchange additional heat to gas-heated generator section 552. It leaves via outlet 576 after which it is sent to the solution heated generator section 554 via inlet 578 to heat further the strong solution after which it leaves via outlet 580, passes through expansion valve 518 and is then passed to the generator cooled absorber (GAX) section 558 via inlet 582 to absorb refrigerant vapor.

Weak solution 572 picks up (absorbs) gas (refrigerant) 584 from evaporator 508 in absorber 502 with the liberation of heat. As shown in FIG. 37, vapor from the refrigerant heat exchanger 596 is sent to the absorber 502 in two phases with the liquid refrigerant phase being sent to the air cooled absorber section 562 while the vapor phase is sent both to the solution cooled absorber 560 and the air cooled absorber 562. After being partially absorbed in the solution cooled absorber section 560, the remaining refrigerant vapor phase is sent to the GAX absorber section 558. Heat is removed air cooled absorber section 562. The cold strong solution 586 leaving the air cooled absorber section 562 through outlet 587 is pressurized using pump 516 and then used to cool rectifier 524 where it passes through inlet 588 and out through outlet 590 after which the strong solution 586 is split with a portion passed to analyzer 522 and the remainder used to cool the solution cooled absorber section 560, entering through inlet 592 and leaving through outlet 594. After cooling the solution cooled absorber section 560, strong solution 586 is sent to GAX generator section 556 for desorption. Heat transfer loop or surface 530 is, as noted, used to gain additional efficiencies by transferring heat liberated from the absorption process in GAX absorber section 558 to GAX desorber section 556 where it is used to heat the desorption process.

It is possible that changes in configurations to other than those shown could be used but that which is shown if preferred and typical. Without departing from the spirit of this invention, various means of fastening the components together may be used.

It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

I claim:

1. A mass and heat transfer device comprising:
   a) a substantially vertical surface separating a first fluid space from a second fluid space;
   b) said first fluid space containing:
      1) a downward flowing liquid in at least a partially flooded state; and
      2) an upward flowing gas within said downward flowing liquid;
      3) a fluid distribution surface having an aperture formed therein;
         (a) said aperture in said fluid distribution surface providing:
            (1) the downward passage and distribution of said downward flowing liquid; and
            (2) the upward passage and distribution of said upward flowing gas in said first fluid space; and
   c) said second fluid space containing a fluid.

2. The mass and heat transfer device according to claim 1 wherein said fluid distribution surface is substantially perpendicular with respect to said substantially vertical surface separating said first fluid space from said second fluid space.

3. The mass and heat transfer device according to claim 2 wherein said vertical surface separating said first fluid space from said second fluid space is an inner cylinder and said first fluid space is an annular space formed by an inclosure comprising said inner cylinder, an outer cylinder, a top and a bottom.

4. The mass and heat transfer device according to claim 3 with said fluid distribution surface formed as an annular plate and with said aperture formed in said fluid distribution surface by removing a segment of said annular plate.

5. The mass and heat transfer device according to claim 4 further comprising a plurality of said annular plates arranged in spaced-apart relation with each other in said annular space.

6. The mass and heat transfer device according to claim 5 wherein said aperture of each successive spaced-apart annular plate on an opposite side from the side of the aperture of the previous annular plate.

7. The mass and heat transfer device according to claim 1 wherein said fluid distribution surface is substantially parallel with respect to said substantially vertical surface separating said first fluid space from said second fluid space.

8. The mass and heat transfer device according to claim 1 wherein said fluid distribution surface is angled with respect to said substantially vertical surface separating said first fluid space from said second fluid space.

9. The mass and heat transfer device according to claim 1 wherein said aperture in said fluid distribution surface is of sufficient size to pass both said liquid and said vapor through said aperture.

10. The mass and heat transfer device according to claim 1 further comprising a second aperture formed in said fluid distribution surface with said liquid passing though said aperture and said vapor through said second aperture.

11. The mass and heat transfer device according to claim 1 wherein said first fluid space is a hexahedral space.

12. The mass and heat transfer device according to claim 11 wherein said hexahedral space is formed from sheet metal plate members and sheet metal frame members.

13. The mass and heat transfer device according to claim 12 with said sheet metal plate members and said sheet metal frame members having apertures formed therein for fluid passage with respect to said first fluid space.

14. The mass and heat transfer device according to claim 1 wherein said first fluid space is a annular space.

15. The mass and heat transfer device according to claim 1 wherein said first fluid space is a cylindrical space.

16. An absorption heat pump system comprising an absorber, a desorber, a condenser, and evaporator with at least one of said absorber, said desorber, said condenser, and said evaporator comprising a mass and heat transfer device according to claim 1.

17. The absorption heat pump system according to claim 16 further comprising a surface for heat exchange between said desorber and said absorber.

18. The absorption heat pump system according to claim 17 further comprising sheet metal plates and sheet metal frames defining said first fluid space.

* * * * *

UNITED STATES PATENT AND TRADEMARK OFFICE
CERTIFICATE OF CORRECTION

PATENT NO. : 6,314,752 B1  
DATED : November 13, 2001  
INVENTOR(S) : Christensen et al.

Page 1 of 1

It is certified that error appears in the above-identified patent and that said Letters Patent is hereby corrected as shown below:

<u>Title page,</u>
Item [75] Inventors: delete the inventor "Roger F. Stout" and substitute therefor
-- Roger E. Stout --.

<u>Column 2,</u>
Line 5, after the word "or" delete the word "form" and substitute therefor the word
-- from --.

<u>Column 8,</u>
Line 15, after the word "are" delete the word "joint" and substitute therefor the
word -- joined --.

<u>Column 20,</u>
Line 63, after the word "to" delete the letter "b" and substitute therefor the word
-- be --.

<u>Column 23,</u>
Line 4, after the word "removed" insert the word -- in --.
Line 21, after the word "shown" delete the word "if" and substitute therefor
the word -- is --.

Signed and Sealed this

Twenty-first Day of May, 2002

Attest:

*Attesting Officer*

JAMES E. ROGAN  
*Director of the United States Patent and Trademark Office*